(12) United States Patent
Kurata et al.

(10) Patent No.: US 8,089,578 B2
(45) Date of Patent: Jan. 3, 2012

(54) SURFACE LIGHT SOURCE DEVICE

(75) Inventors: Gouo Kurata, Kusatsu (JP); Kazuhide Hirota, Moriyama (JP); Tsuyoshi Arai, Koka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 13/058,927

(22) PCT Filed: Jul. 22, 2009

(86) PCT No.: PCT/JP2009/003435
§ 371 (c)(1),
(2), (4) Date: May 6, 2011

(87) PCT Pub. No.: WO2010/021083
PCT Pub. Date: Feb. 25, 2010

(65) Prior Publication Data
US 2011/0205759 A1    Aug. 25, 2011

(30) Foreign Application Priority Data

Aug. 18, 2008 (JP) ................................. 2008-209832

(51) Int. Cl.
*G02F 1/1335* (2006.01)
(52) U.S. Cl. ................. 349/61; 349/56; 349/62; 349/67; 362/611; 362/615
(58) Field of Classification Search .................... 349/56, 349/61, 62, 67; 362/611, 615
See application file for complete search history.

(56) References Cited

U.S. PATENT DOCUMENTS 7,372,519 B2* 5/2008 Kim et al. ....................... 349/60
7,372,520 B2* 5/2008 Mitsuhashi et al. ............ 349/61
7,445,358 B2* 11/2008 Matsushita .................... 362/330

FOREIGN PATENT DOCUMENTS

| JP | 5-053111 A | 3/1993 |
| JP | 10-247413 A | 9/1998 |
| JP | 11-237633 A | 8/1999 |

(Continued)

OTHER PUBLICATIONS

Patent Abstracts of Japan, Publication No. 05-053111, dated Mar. 5, 1993, 1 page.

(Continued)

*Primary Examiner* — Jennifer Doan
(74) *Attorney, Agent, or Firm* — Osha • Liang LLP

(57) ABSTRACT

In a light guide plate 63, a light introducing unit 65 having a thickness larger than that of a light guide plate body 64 is provided at an end of the light guide plate body 64. A point source of light 62 is placed so as to face an end face of the light introducing unit 65 (a light incident end face 66). The light introducing unit 65 has a protruding portion in a shape of a half of a frustum of a cone protruding from a surface on the light guide plate 63 to have a large thickness, and the protruding portion has an outer perimeter surface forming an inclined surface 67. On the inclined surface 67, V-groove structures 68a are arranged along the outer perimeter surface of the protruding portion to configure a directivity conversion pattern 68. Furthermore, on an inner perimeter portion of the directivity conversion pattern 68, an auxiliary inclined surface 71 having an angle of inclination smaller than the angle of inclination of the inclined surface 67 is formed along an inner perimeter edge of the directivity conversion pattern 68.

6 Claims, 40 Drawing Sheets

FOREIGN PATENT DOCUMENTS

| | | |
|---|---|---|
| JP | 2004-069751 A | 3/2004 |
| JP | 2004-241369 A | 8/2004 |
| JP | 2005-285389 A | 10/2005 |
| WO | 2008/153024 A1 | 12/2008 |

OTHER PUBLICATIONS

Abstract of JP 2004-069751, Publication date: Mar. 4, 2004, Data supplied from the espacenet database—Worldwide, 1 page.

Abstract of JP 2005-285389, Publication date: Oct. 13, 2005, Data supplied from the espacenet database—Worldwide, 1 page.

International Search Report issued in PCT/JP2009/003435, mailed on Sep. 1, 2009, with translation, 3 pages.

Written Opinion issued in PCT/JP2009/003435, mailed on Sep. 1, 2009, 3 pages.

* cited by examiner

|  | acrylic resin | polycarbonate resin |
|---|---|---|
| refractive index : n | 1.49 | 1.59 |
| height of tapered portion : T (mm) | 4.10 | 4.10 |
| largest light guide angle : α (°) | 42.16 | 38.97 |
| angle of inclination of tapered portion : θ (°) | 2.84 | 6.03 |
| holizontal length of incliend surfaxe : X (mm) | 7.10 | 6.11 |
| difference in height of inclined surface : Y (mm) | 0.35 | 0.65 |
| thickness of light guide plate body : t (mm) | 3.75 | 3.45 |

Fig.4

PRIOR ART

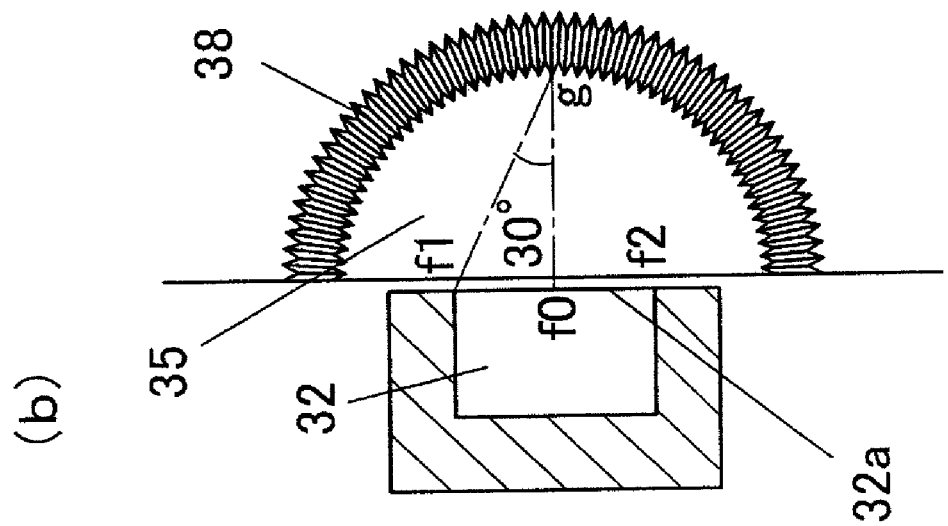
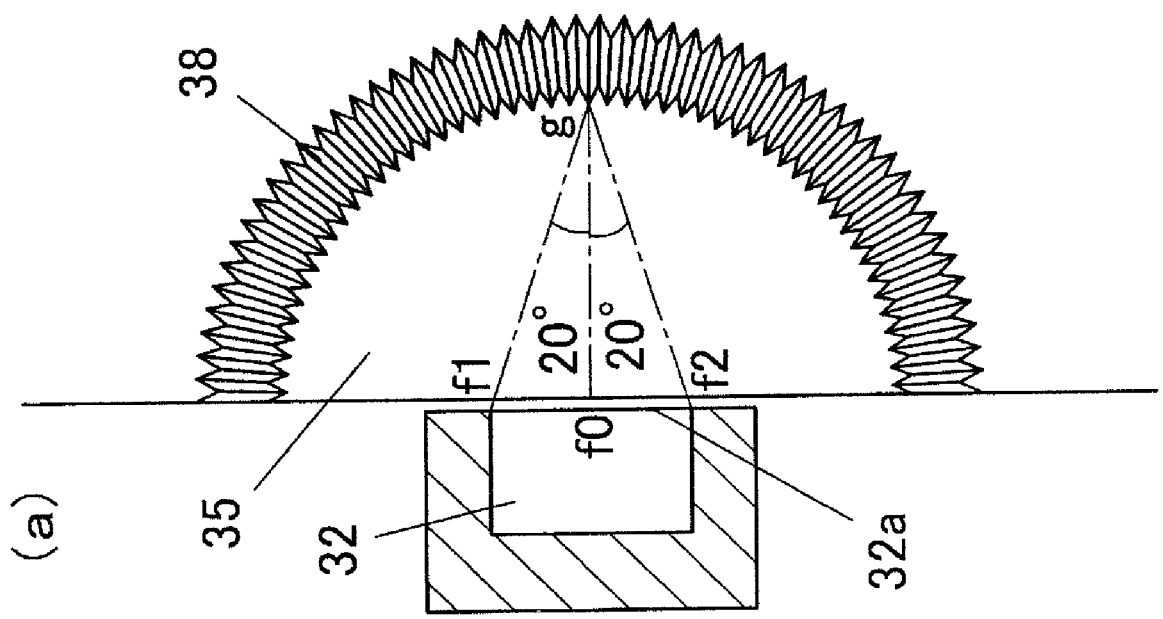
Fig.7

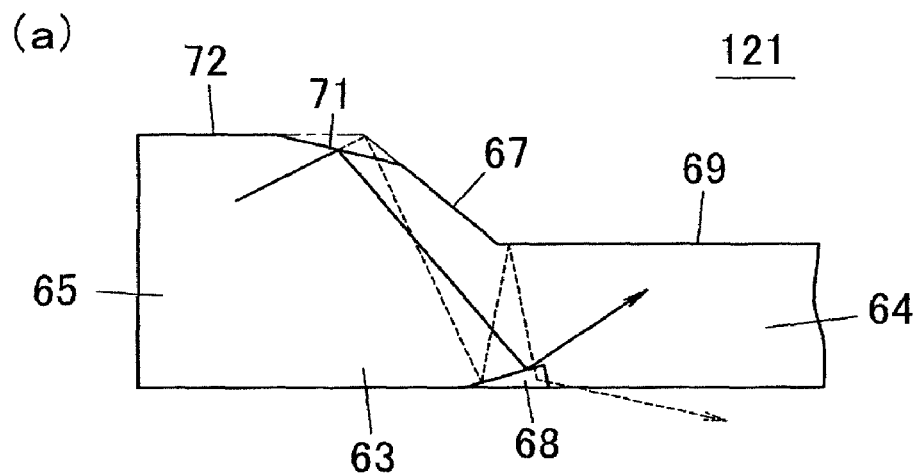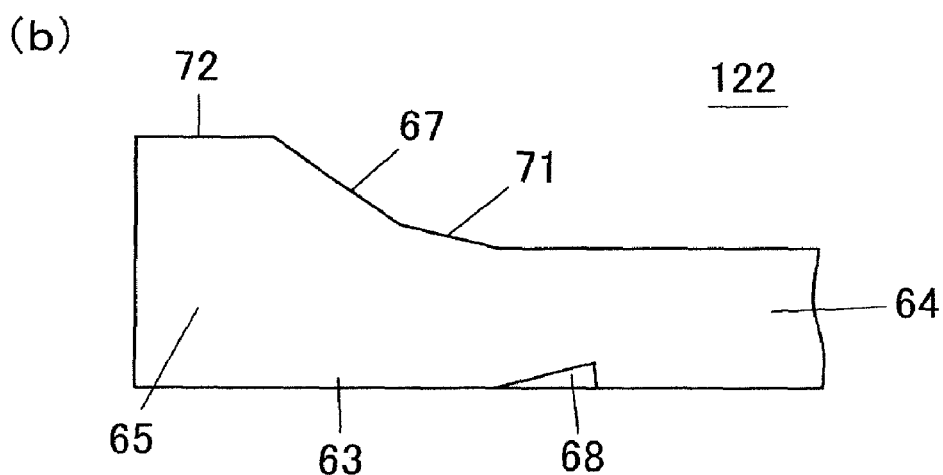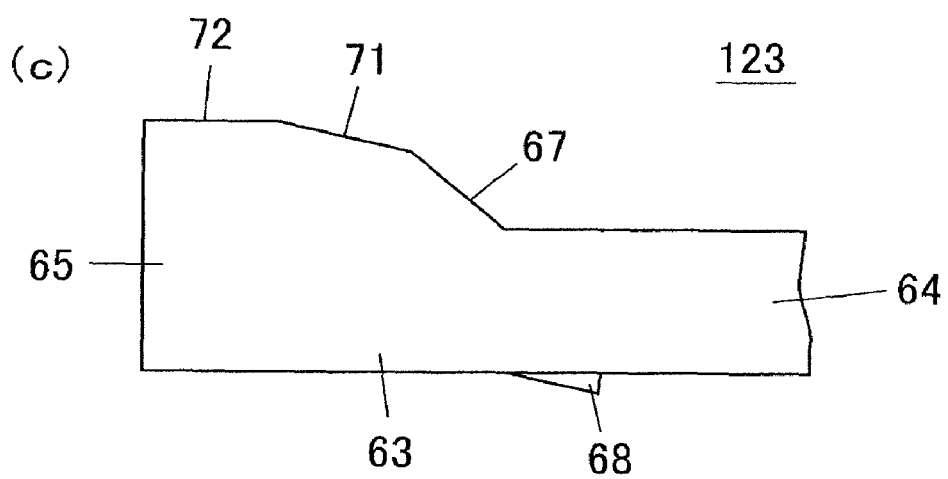
Fig.33

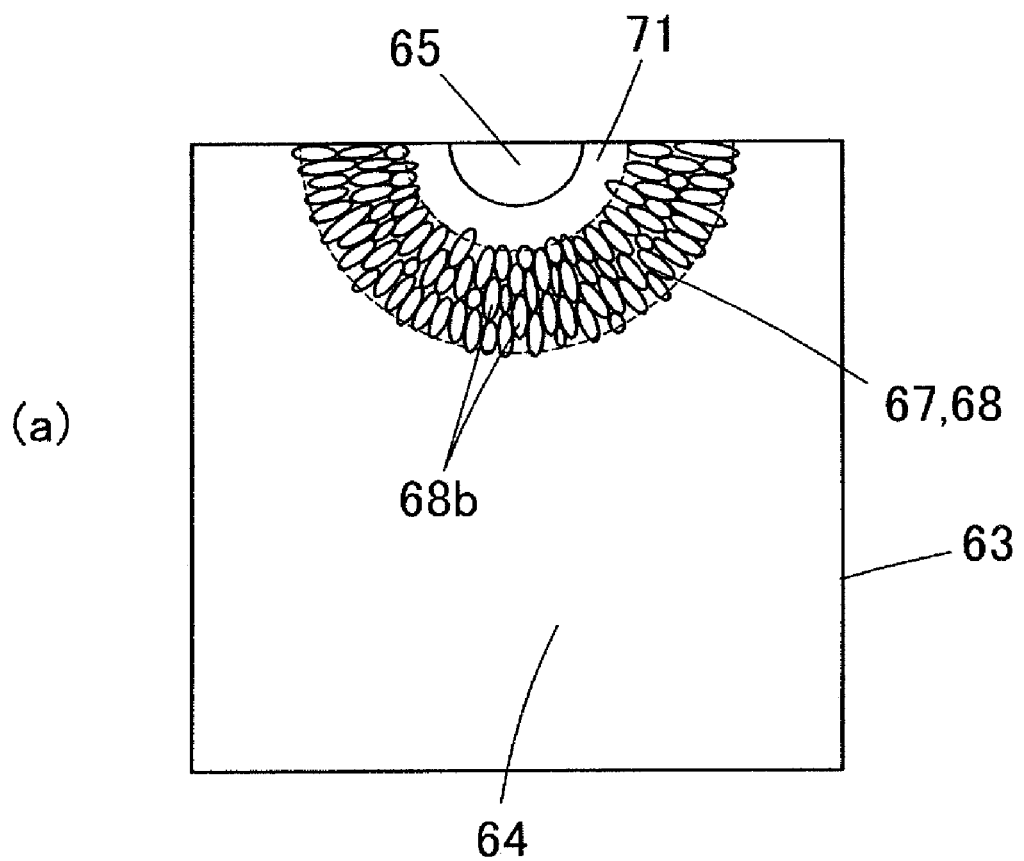
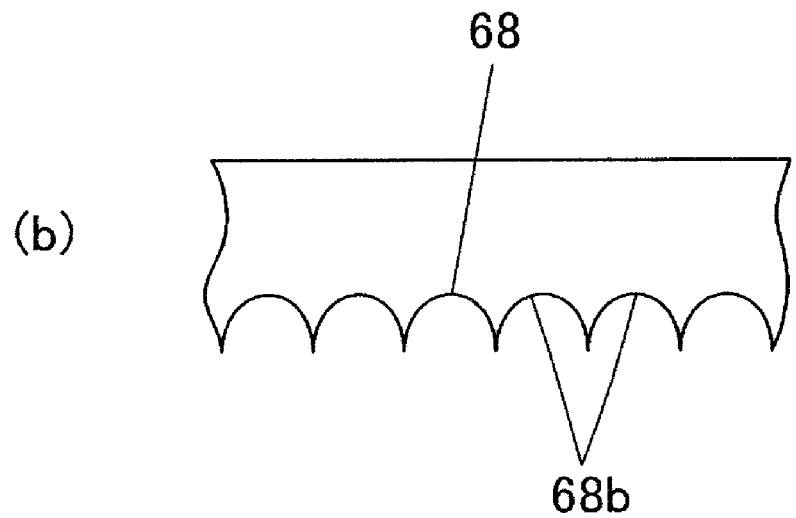
Fig.35

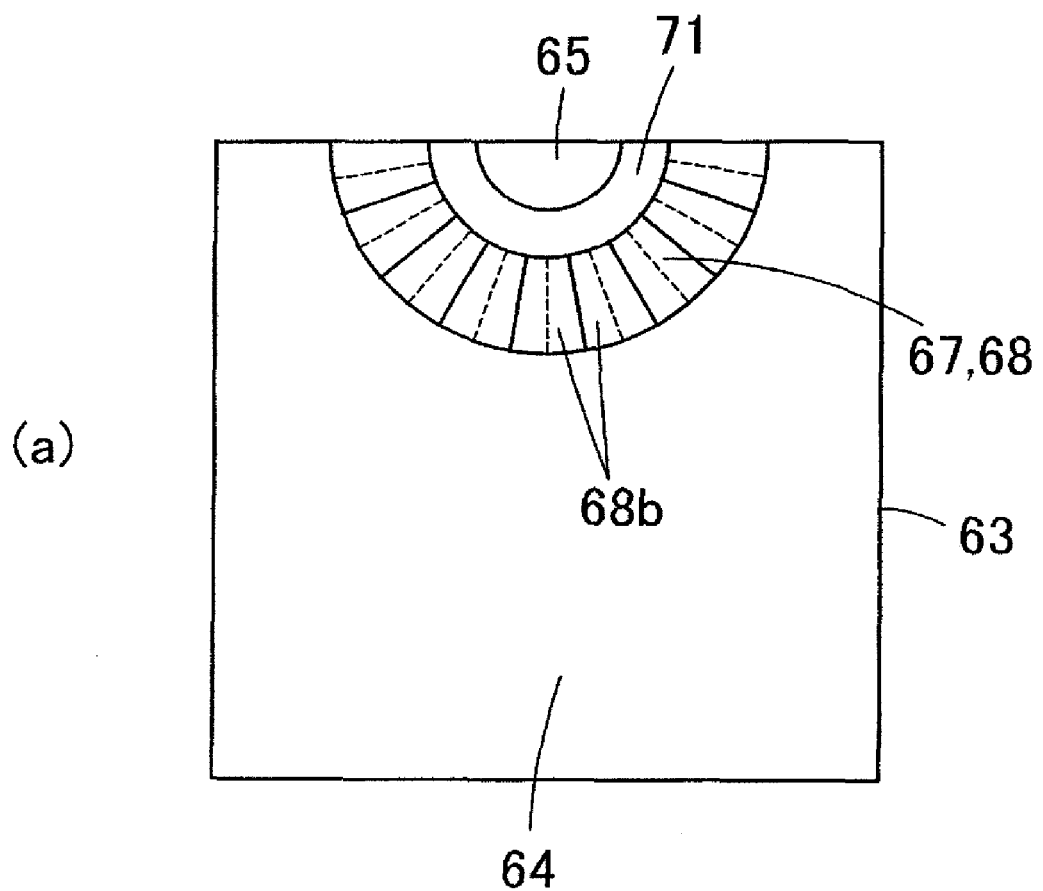
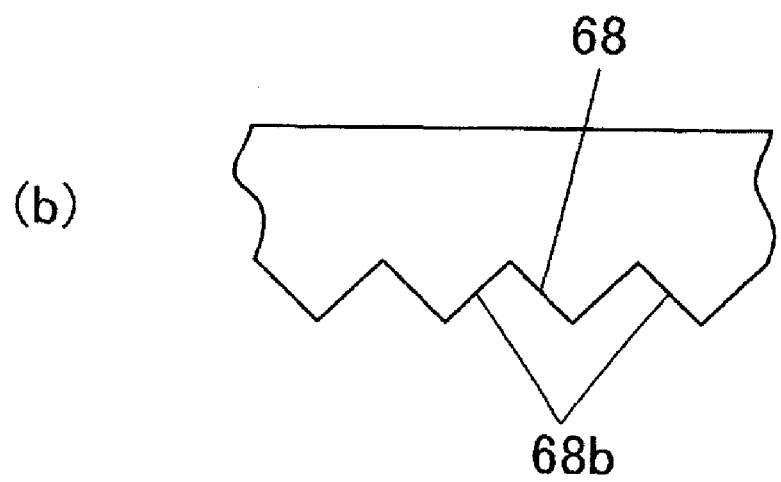
Fig.36

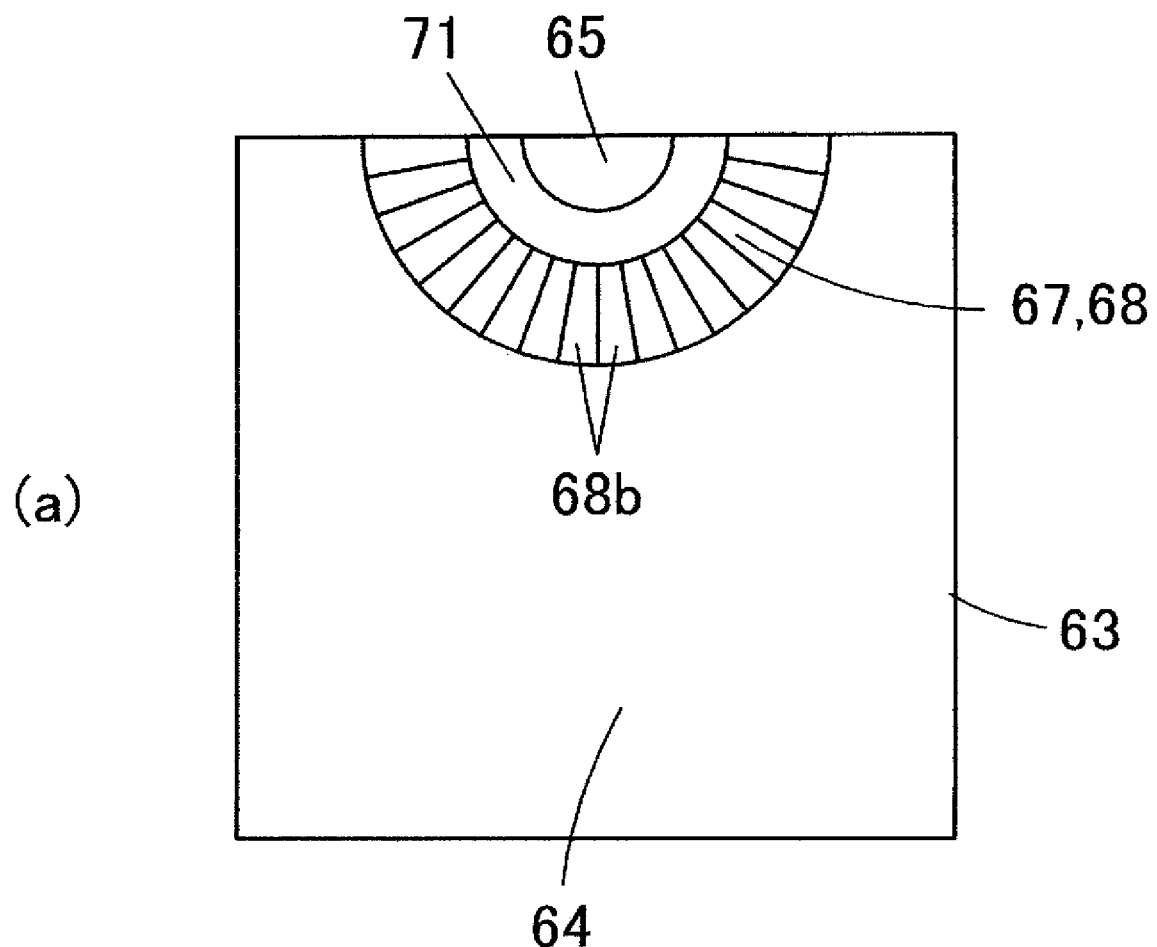
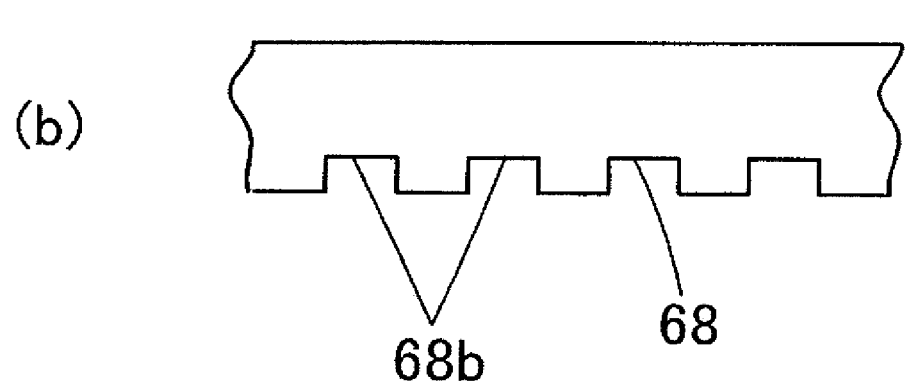
Fig.38

SURFACE LIGHT SOURCE DEVICE

TECHNICAL FIELD

The present invention relates to surface light source devices and, specifically, to the structure of a surface light source device for allowing light to efficiently enter a light guide plate having a thickness thinner than the thickness of a light source.

BACKGROUND ART

FIG. 1 depicts a schematic view of a conventional liquid crystal display device 11 using an edge-light-type surface light source device. This liquid crystal display device 11 includes a surface light source device 12 and a liquid crystal panel 15.

In the surface light source device 12, a point source of light 18 using an LED is placed so as to face an end face (a light incident end face) of a light guide plate 17 molded of transparent resin, a diffusion plate 13 and two prism sheets 14 are stacked on an upper surface (or a light emission surface) of the light guide plate 17, and a reflector plate 16 faces a lower surface of the light guide plate 17. Note that the point source of light 18 is implemented in a substrate 20. A liquid crystal panel 15 is placed on the prism sheets 14 via a rim sheet 19 (or black frame).

Thus, light emitted from the point source of light 18 enters the inside of the light guide plate 17 from an end face of the light guide plate 17, propagates through the inside of the light guide plate 17, and is emitted from an approximately entire upper surface of the light guide plate 17. Light emitted from the upper surface of the light guide plate 17 passes through the diffusion plate 13 and the prism sheets 14 to illuminate the liquid crystal panel 15 from a back surface side. Also, light leaking from the lower surface of the light guide plate 17 is reflected off the reflector plate 16 and returns to the inside of the light guide plate 17 for reuse of light.

In the surface light source device 12 as described above, in addition to uniform luminance, high luminance, and low cost, a large light emission area (a small area other than a light emission region) and a thin thickness are demanded. In particular, when the surface light source device 12 is incorporated in a portable device, a demand for reducing the thickness of the surface light source device 12 is increasing more according to reduction in thickness of a portable device The size of each component of a surface light source device used in general is as follows:
- the sum of the thicknesses of the substrate and the point source of light: 600 µm;
- the height of the light emission window of the point source of light: 300 µm;
- the thickness of the prism sheet: 62 µm (per sheet);
- the thickness of the light diffusion plate: 55 µm;
- the thickness of the light guide plate: 300 to 650 µm;
- the thickness of the reflector plate: 60 µm; and
- the thickness of the rim sheet: 55 µm Thus, this surface light source device has a thickness on the order of 600 µm on a point source of light side and approximately 539 to 889 µm on a light guide plate side even if the thickness of the rim sheet is excluded. Therefore, it is desired to thin the thickness on a light guide plate side occupying most of the area of the surface light source device.

What occupies most of the thickness of the surface light source device is the light guide plate. However, when the thickness of the light guide plate is thinner than the height of the light emission window of the point source of light, an amount of light emitted from the point source of light but not entering the light guide plate is increased, thereby decreasing light use efficiency of the surface light source device. Therefore, the thickness of the light guide plate is restricted by the height of the light emission window of the point source of light, and it is difficult to make the thickness of the surface light source device thinner than the height of the light emission window of the point source of light. Similarly, when the light source is a cold-cathode tube, it is difficult to make the thickness of the light guide plate thinner than the diameter of the cold-cathode tube.

(Regarding Patent Document 1)

FIG. 2 is a side view of a liquid crystal display device 21 disclosed in Japanese Unexamined Patent Application Publication No. H5-53111 (Patent Document 1). In a surface light source device 22 for use in this liquid crystal display device 21, in order to allow light from a fluorescent tube 23 to enter a light guide plate having a thickness thinner than the fluorescent tube 23, a tapered portion 25 is provided at a portion of the light guide plate having a thin thickness, that is, at an end of a light guide plate body 24. An end face of the tapered portion 25 has a height approximately equal to the diameter of the fluorescent tube 23, and the fluorescent tube 23 faces the end face. And, light entering from the end face of the tapered portion 25 is guided to the light guide plate body 24 by being totally reflected off the front and back surfaces of the tapered portion 25, and is emitted from an upper surface of the light guide plate body 24 to a liquid crystal panel 26.

The surface light source device 22 disclosed in Patent Document 1 has an object of guiding light of the fluorescent tube 23 to the light guide plate without leakage. To this end, the height of the end face of the tapered portion 25 is set approximately equal to the diameter of the florescent tube 23 to allow light of the fluorescent tube 23 to be guided to the tapered portion 25 without leakage. However, in the source light source device 22, light leakage cannot be prevented in the tapered portion 25. Therefore, light leaking from the tapered portion 25 is viewed as glowing from an observer side, and an edge of a display unit (screen) of the liquid crystal display device emits light with high luminance to degrade the quality of the display unit.

The reason why light leakage from the tapered portion 25 cannot be prevented with this structure of the surface light source device 22 is described by using FIG. 3. Now consider light that is prone to leak most from the tapered portion 25. If leakage of this light that is prone to leak most is prevented, it can be said that light leakage from the tapered portion 25 is eliminated in the surface light source device 22. Light that is prone to leak most is a light beam L having the largest light guide angle (an angle formed with a horizontal plane) among light going out from the fluorescent tube 23 and entering the tapered portion 25. Therefore, consider the structure in which the light beam L having the largest light guide angle does not leak from the tapered portion 25 and the thickness of the light guide plate body 24 can be made as thin as possible. To find this structure, as depicted in FIG. 3, consider the condition for allowing the light beam L having a largest light guide angle α to be totally reflected off an upper end (a point A) of an inclined surface of the tapered portion 25 and then again totally reflected off a point B of a lower surface of the light guide plate to be reflected off an upper surface (a point C) adjacent to the tapered portion 25 of the light guide plate body 24. Note that a short flat-shaped portion is depicted at an end face portion of the tapered portion 25 in FIG. 3 merely for convenience of depiction, and the length of the short flat-shaped portion can be thought as being infinitely short.

First, the largest light guide angle $\alpha$ of light entering the tapered portion 25 is determined by $$\sin \alpha = 1/n \quad \text{(Equation 1)}$$

(where n is a refractive index of the light guide plate).

An angle of incidence at which the light beam L having this largest light guide angle $\alpha$ enters the point A positioned on the inclined surface having an angle of inclination $\theta$ is $90°-\theta-\alpha$. Therefore, a condition of total reflection of the light beam L off the inclined surface is $$\theta \leq 90° - 2\alpha \quad \text{(Equation 2)}.$$

Also, an angle of incidence at which the light totally reflected off the point A enters a lower surface of the tapered portion 25 is $90°-2\cdot\theta-\alpha$. Therefore, a condition of total reflection of the light beam L off the point B of the lower surface is $$\theta \leq 45° - \alpha \quad \text{(Equation 3)}.$$

If this Equation 3 is satisfied, the light beam L totally reflected off the point B is also totally reflected off the point C of the light guide plate body 24.

Therefore, it can be found from Equation 2 and Equation 3 that, in order to allow the light beam L to be totally reflected off the point A, the point B, and the point C, $$\theta \leq 45° - \alpha \quad \text{(Equation 4)}$$

is satisfied. However, if the angle of inclination $\theta$ of the tapered portion 25 is small, there is a possibility that light totally reflected off the upper end of the inclined surface of the tapered portion 25 and then totally reflected off the lower surface of the light guide plate again enters the inclined surface of the tapered portion 25 and leaks from the tapered portion 25. Also, if the angle of inclination $\theta$ is small, the length of the tapered portion 25 is long, and therefore the angle of inclination $\theta$ is desired to be as large as possible as long as Equation 4 is satisfied. Therefore, the angle of inclination $\theta$ is set to have a value as large as possible within a limitation of satisfying Equation 4. That is, $$\theta = 45° - \alpha \quad \text{(Equation 5)}.$$

Then, when the height of the end face of the tapered portion 25 is taken as T, the length of the tapered portion 25 is taken as X, and the difference in height of the inclined surface of the tapered portion 25 is taken as Y, from FIG. 3, the length X and the difference in height Y of the tapered portion 25 become $$X = T\cot(\alpha + 2\cdot\theta) + (T-Y)\cot(\alpha + 2\cdot\theta)$$
$$= (2T - Y)\cot(\alpha + 2\cdot\theta),$$

and $$Y = X\tan\theta.$$

By solving these equations for X and Y and using Equation 5, the following Equation 6 and Equation 7 can be obtained.

$$x = \frac{2a(1+a) \times T}{1 + 2a - a^2} \quad \text{(Equation 6)}$$

$$y = \frac{2a(1-a) \times T}{1 + 2a - a^2} \quad \text{(Equation 7)}$$

where, $a = \tan\alpha = \tan(45°-\theta)$

Also, the light guide plate body 24 has a thickness t, which is represented by the following Equation 8.

$$t = T - y = \frac{(1+a^2) \times T}{1 + 2a - a^2} \quad \text{(Equation 8)}$$

As a light guide plate material, consider acrylic resin or polycarbonate resin (PC resin), which is a typical light guide plate material, and it is assumed for calculation that the light guide plate has a refractive index n as n=1.49 (in the case of acrylic resin), and
n=1.59 (in the case of polycarbonate resin).

With this, from Equation 1, the largest light guide angle $\alpha$ becomes $\alpha$=42.16° (in the case of acrylic resin), and
$\alpha$=38.97° (in the case of polycarbonate resin).

From Equation 3, the angle of inclination $\theta$ of the tapered portion 25 becomes $\theta$=2.84° (in the case of acrylic resin), and
$\theta$=6.03° (in the case of polycarbonate resin).

Also, in Patent Document 1, since the height of the end face of the tapered portion 25 is described as T=4.10 mm, by using this value of the height T and the value of a above, from Equations 6 to 8, the length X of the tapered portion 25 and the difference in height Y, and the thickness t of the light guide plate body 24 are found as follows. When the light guide plate material is acrylic resin, since T=4.10 mm and $\alpha$=42.16° (in Equations 6 to 8, $a$=tan $\alpha$=0.91), X=7.10 mm,
Y=0.35 mm, and
t=3.75 mm.

Similarly, when the light guide plate material is polycarbonate resin, since T=4.10 mm and $\alpha$=38.97° (in Equations 6 to 8, $a$=tan $\alpha$=0.81), X=6.11 mm,
Y=0.65 mm, and
t=3.45 mm.

FIG. 4 shows the calculation results as above.

According to FIG. 4, the thickness t of the light guide plate body 24 is 3.75 mm (in the case of acrylic resin) or 3.45 mm (in the case of polycarbonate resin). By contrast, in the liquid crystal display device 21 disclosed in Patent Document 1, the height of the end face of the tapered portion 25 is T=4.10 mm and the thickness of the light guide plate body 24 is t=2.2 mm. The value of t=2.2 mm is considerably thinner than the value of the thickness t found though the calculation above (in FIG. 4). Therefore, light inevitably leaks from the tapered portion 25.

Therefore, in the surface light source device 22 disclosed in Patent Document 1, it is impossible to prevent light leakage from the tapered portion 25. Alternatively, in the surface light source device 22 disclosed in Patent Document 1, at least light leakage from the tapered portion 25 is not considered at all. Alternatively, to eliminate light leakage, the thickness t of the light guide plate body 24 cannot be made thinner with respect to the thickness T of the tapered portion 25, or the length X of the tapered portion 25 has to be made very long.

(Regarding Patent Documents 2 and 3)

Japanese Unexamined Patent Application Publication No. 2004-69751 (Patent Document 2) and Japanese Unexamined Patent Application Publication No. 2005-285389 (Patent Document 3) each also disclose a surface light source device. However, in the surface light source device described in Patent Document 2, light leaking from a light guide plate to the outside cannot be sufficiently suppressed, and leaking light glows on the display surface of a liquid crystal display device to degrade the quality of the liquid crystal display device. Also, in the surface light source device described in Patent Document 3, light is absorbed at a light reflector plate, and light reflected off the light reflector plate leaks from a light incident end surface, thereby decreasing light use efficiency. Note that technical problems of the surface light source devices in Patent Documents 2 and 3 are specifically described in Patent Document 4.

(Regarding Patent Document 4)

Therefore, the applicant of the present invention has disclosed in the previously-submitted international application (PCT/JP2008/60610: Patent Document 4) a surface light source device allowing the thickness of a light guide plate body to be made sufficiently small compared with the height of a light incident end face and also further decreasing light leakage from a tapered light introducing unit. This surface light source device 31 includes a point source of light 32 using an LED and a light guide plate 33 as depicted in FIG. 5. The light guide plate 33 is formed by providing a light introducing unit 35 to an end of a light guide plate body 34, and is molded with transparent resin having a high refractive index. The light introducing unit 35 has a thickness thicker than that of the light guide plate body 34, and has its end face which the point source of light 32 faces. In the light introducing unit 35, a protruding portion in a shape of an approximately half of a frustum of a cone protrudes from a surface on the same side of a light emission surface 39 of the light guide plate body 34 to increase the thickness of the light introducing unit 35. An outer perimeter surface of the protruding portion forms an inclined surface 37. Along this inclined surface 37, a directivity conversion pattern 38 is formed. Note that, although not shown, on a side (back side) of the light guide plate body 34 opposite to the light emission surface 39, many light emitting means 40 (refer to FIG. 6) each in a prism shape are formed for causing light guided in the light guide plate body 34 to be reflected and emitted from the light emission surface 39.

As such, in this surface light source device 31, as depicted in FIG. 6, light L emitted from the point source of light 32 enters the inside of the light introducing unit 35 from the light incident end face 36, and is totally reflected off the directivity conversion pattern 38 and a lower surface of the light introducing unit 35 or passes through the light introducing unit 35 to be guided to the light guide plate body 34 having a thin thickness. The light guided to the light guide plate body 34 is totally reflected or diffused by the light emitting means 40 to be emitted approximately uniformly from the light emission surface 39.

Then, in the above-structured surface light source device 31, for example, when it is assumed that the refractive index of the light guide plate 33: n=1.59;
the vertical angle of each mountain-shaped portion of the directivity conversion pattern 38: $\phi 3=120°$;
the thickness of the end face of the light introducing unit 35: T=0.31 mm;
the thickness of the light guide plate body 34: t=0.18 mm;
the length of an upper surface of the light introducing unit 35: s1=2.50 mm;
the length of the light introducing unit 35: s2=3.19 mm; and
the angle of inclination of the inclined surface 37: $\theta 1=15.3°$, light leakage from the light guide plate 33 can be eliminated in a plane perpendicular to the light emission surface 39.

Also, in a plan view of the light introducing unit 35 depicted in FIG. 7 (a), an angle (hereinafter referred to as a half-width expected angle) formed by a line segment connecting one end f1 of the light emission window 32a of the point source of light 32 and a center g of an edge of the directivity conversion pattern 38 on an inner perimeter side and a line segment connecting a center f0 of the light emission window 32a and the center g of the edge of the directivity conversion pattern 38 on the inner perimeter side is assumed to be 20°. Also, an angle formed by a line segment connecting another end f2 of the light emission window 32a of the point source of light 32 and the center g of the edge of the directivity conversion pattern 38 on the inner perimeter side and a line segment connecting the center f0 of the light emission window 32a and the center g of the edge of the directivity conversion pattern 38 on the inner perimeter side is assumed to be 20°. In this example, since the occupied area of the light introducing unit 35 is increased, a dead space of the light guide plate 33 is increased. However, due to refraction of light entering the light introducing unit 35, a spread of light at the center portion of the directivity conversion pattern 38 in a horizontal direction is decreased to be smaller than 20°. At a portion away from the center of the directivity conversion pattern 38, the spread of light in a horizontal direction is further decreased. With this, light leakage can be prevented in the entire directivity conversion pattern 38. Therefore, leaked light is extremely decreased in a plane parallel to the light emission surface 39, and leaked light/incident light≦2% can be satisfied.

Therefore, in the surface light source device disclosed in Patent Document 4, even when the angle of inclination $\theta 1$ of the inclined surface 37 is large, such as 15.3°, it is possible to extremely decrease light leakage from the light guide plate 33.

However, in the market of surface light source devices, together with reduction in thickness, a light guide plate with a small dead space is strongly demanded. Therefore, for commercialization of the surface light source device 31, consideration of decreasing the occupied area of the light introducing unit 35 is required. As a result of decreasing the occupied area of the light introducing unit 35 as such, in the practical surface light source device 31, as depicted in FIG. 7(b), an angle (a half-width expected angle) formed by a line segment connecting one end f1 of the light emission window 32a of the point source of light 32 and the center g of the edge of the directivity conversion pattern 38 on the inner perimeter side and a line segment connecting the center f0 of the light emission window 32a and the center g of the edge of the directivity conversion pattern 38 on the inner perimeter side is 30°. As a result, compared with the case of FIG. 7(a) where this angle is 20°, leaked light is increased, that is, leaked light/incident light≦15%.

Therefore, when the occupied area of the light introducing unit 35 is decreased, leaked light reaches as much as 15%, disadvantageously resulting in a decrease in light use efficiency of the surface light source device and bringing a decrease in luminance of the luminescent surface (the light emission surface 39). Also, as depicted in FIG. 8, due to light leaking from the directivity conversion pattern 38, a light emission region J with high luminance occurs at the edge of the light introducing unit 35, thereby degrading the quality of the surface light source device 31.

[Patent Document 1] Japanese Unexamined Patent Application Publication No. 1-15-53111
[Patent Document 2] Japanese Unexamined Patent Application Publication No. 2004-69751

[Patent Document 3] Japanese Unexamined Patent Application Publication No. 2005-285389

[Patent Document 4] PCT/JP2008/60610

DISCLOSURE OF THE INVENTION

Problem to be Solved by the Invention

The present invention relates to an improvement of the surface light source device disclosed in Patent Document 4, and has an object of providing a surface light source device allowing more improved light use efficiency, in particular, a surface light source device allowing more improved light use efficiency even when the light introducing unit is made small.

Means to Solve the Problem

To achieve the object above, a surface light source device of the present invention includes a point source of light and a light guide plate causing light of the point source of light to be introduced from a light incident surface and be emitted from a light emission surface to outside. The point source of light is provided at a position facing the light incident surface of the light guide plate. The light guide plate includes a light introducing unit for trapping light from the point source of light entering from the light incident surface and a light guide plate body having a thickness smaller than a maximum thickness of a light introducing unit, being provided so as to be continuous to the light introducing unit, and causing the trapped light to be emitted from the light emission surface to outside by light emitting means. The light introducing unit has a first inclined surface on a surface of the light guide plate on a light emission side or a surface opposite thereto, the first inclined surface being inclined from a surface of a portion having a thickness larger than that of the light guide plate body toward an end of a surface of the light guide plate body. The light introducing unit has a second inclined surface having an angle of inclination smaller than that of the first inclined surface, the second inclined surface being provided on at least one of a side closer to the point source of light than the first inclined surface and a side away from the point source of light. The light introducing unit has a directivity conversion pattern on a surface of the light guide plate body on a light emission side or a surface opposite thereto, the directivity conversion pattern formed of patterns extending in a radial direction and centering near the point source of light, the pattern for converting a directivity spread of light entering the light introducing unit in a thickness direction of the light guide plate to a directivity characteristic inclined toward a direction parallel to a surface direction of the light guide plate.

In the surface light source device of the present invention, the light introducing unit having a large thickness is provided at a position facing the point source of light of the light guide plate. Therefore, light of the point source of light can be efficiently introduced from the light introducing unit to the inside of the light guide plate. Also, the first inclined surface is provided between the light introducing unit having a thick thickness and the light guide plate body having a thin thickness. Therefore, light introduced to the light introducing unit can be guided to the light guide plate body having a thin thickness. Furthermore, the light introducing unit is provided with the directivity conversion pattern extending in a radial direction and centering near the point source of light, the pattern for converting a directivity spread of light entering the light introducing unit in a thickness direction of the light guide plate to a directivity characteristic inclined toward a direction parallel to a surface direction of the light guide plate. Therefore, even when the angle of inclination of the first inclined surface is increased, light entering the light introducing unit can be guided to the light guide plate body having a small thickness with minimum leakage or so that light leakage is prevented. Thus, the thickness of the light guide plate can be reduced with minimum loss of light.

Furthermore, in the surface light source device of the present invention, the second inclined surface having an angle of inclination smaller than that of the first inclined surface is provided on at least one of the side closer to the point source of light than the first inclined surface and a side away from the point source of light. Therefore, even when the light introducing unit is small, among light beams introduced to the light introducing unit, light beams entering the directivity conversion pattern a plurality of times and leaking from the light introducing unit can be suppressed. Thus, light use efficiency of the surface light source device can be improved while decreasing a dead space of the light guide plate. Also, since leakage of light from the directivity conversion pattern can be suppressed, a phenomenon in which the edge of the light introducing unit glows with high luminance can be suppressed, thereby improving the quality of the surface light source device.

In an embodiment of the surface light source device of the present invention, the first inclined surface and the second inclined surface are provided to areas adjacent to each other. According to this embodiment, since there is no superfluous region between the first inclined surface and the second inclined surface, a dead space of the light guide plate can be further decreased.

The second inclined surface in another embodiment of the surface light source device of the present invention is provided to only part of either one of an adjacent area along the first inclined surface on a side close to the point source of light and an adjacent area along the first inclined surface on a side away from the point source of light. A directivity spread of light inside the light introducing unit in a plane perpendicular to the light emission surface varies depending on the direction of the plane. Therefore, in a direction in which light does not reach and in a direction in which a directivity spread is small, the second inclined surface may not be provided. The second inclined surface is not necessarily provided along the entire first inclined surface, and may be partially provided.

In still another embodiment of the surface light source device of the present invention, the second inclined surface is configured of a flat surface, and a normal line perpendicular to the second inclined surface is within a plane perpendicular to the light incident surface and the light emission surface. According to this embodiment, since the second inclined surface is a flat surface, the second inclined surface or a metal mold for molding the second inclined surface can be easily processed, thereby facilitating manufacturing of the light guide plate.

The second inclined surface in still another embodiment of the surface light source device of the present invention is configured of a plurality of flat surfaces, and flat surfaces adjacent to each other both protrude toward an outer surface side of the light introducing unit. According to this embodiment, since a curved second inclined surface can be approximated by a plurality of flat surfaces, the second inclined surface or a metal mold for molding the second inclined surface can be easily processed, thereby facilitating manufacturing of the light guide plate.

The second inclined surface in still another embodiment of the surface light source device of the present invention is configured of a curved surface. According to this embodiment, the second inclined surface is formed of a curved surface, the direction of light reflected off the second inclined surface does not change discontinuously at a curved portion, and a behavior of light reflected off the second inclined surface can be approximately made uniform.

Note that means for solving the problem described above in the present invention has features obtained by appropriately combining the components described above, and the present invention allows many variations formed by combining these components.

BRIEF DESCRIPTION OF THE DRAWINGS

FIG. 4 depicts an example of dimensions of the surface light source device above.

FIG. 7(a) and FIG. 7(b) are drawings that depict a relation between an angle viewed a light emission window of a point source of light from the center of the inner perimeter of the directivity conversion pattern 38 and the size of the directivity conversion pattern.

FIGS. 33(a) to 33(c) are schematic sectional views of the structure of still another light introducing unit of the present invention.

FIG. 35(a) is a schematic plan view of a light guide plate in a sixth embodiment of the present invention, and FIG. 35(b) is an enlarged sectional view of its directivity conversion pattern.

FIG. 36(a) is a schematic plan view of a light guide plate including a different directivity conversion pattern in the sixth embodiment, and FIG. 36(b) is an enlarged sectional view of its directivity conversion pattern.

FIG. 38(a) is a schematic plan view of a light guide plate including still another directivity conversion pattern in the sixth embodiment, and FIG. 38(b) is an enlarged sectional view of its directivity conversion pattern.

Figure 1:
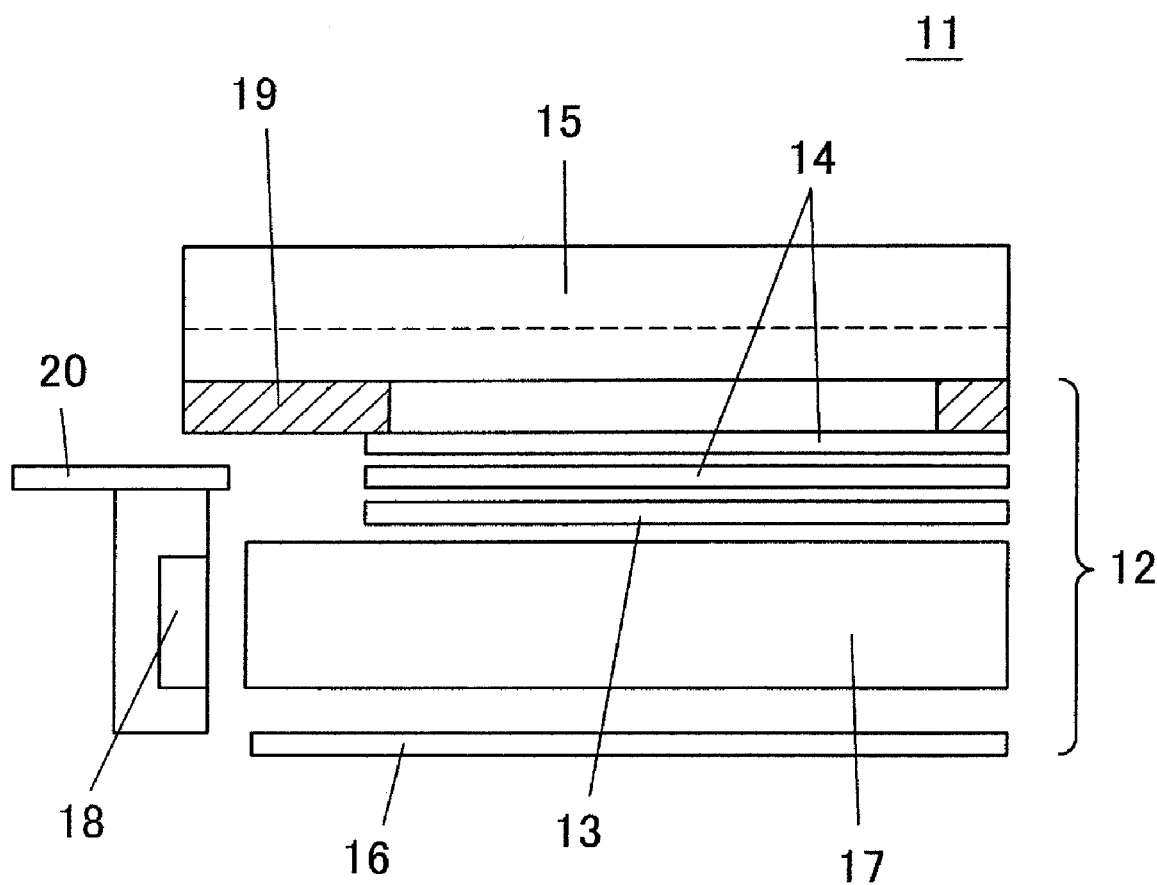
FIG. 1 is a schematic diagram of a conventional liquid crystal display device using an edge-light-type surface light source device.
Figure 2:
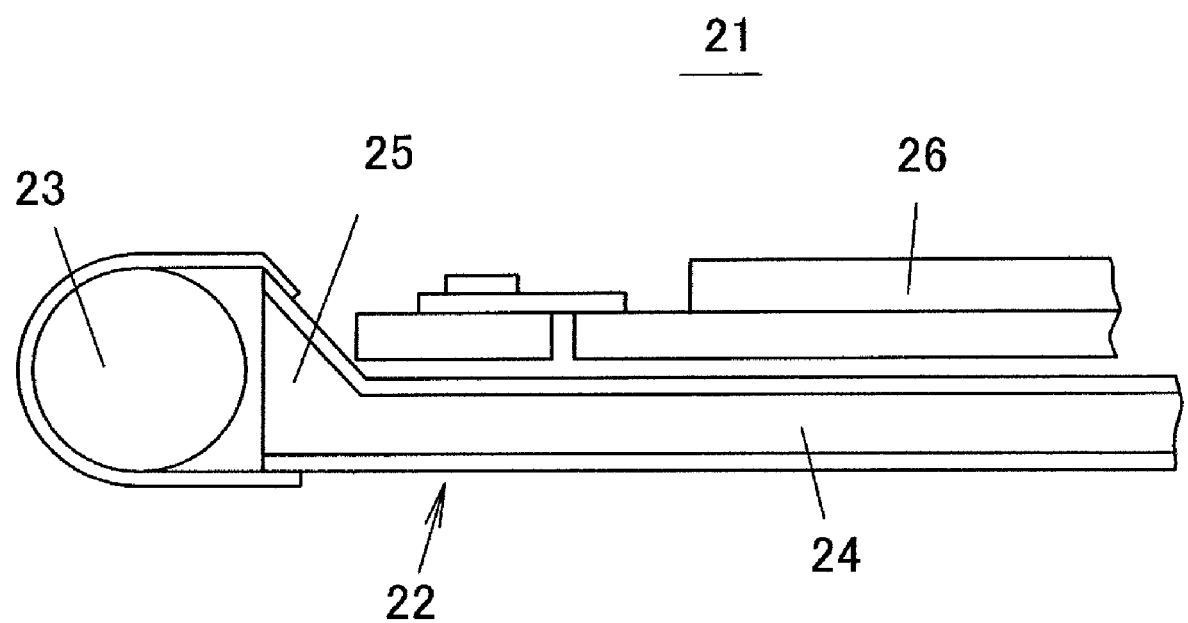
FIG. 2 is a side view of a liquid crystal display device disclosed in Patent Document 1.
Figure 3:
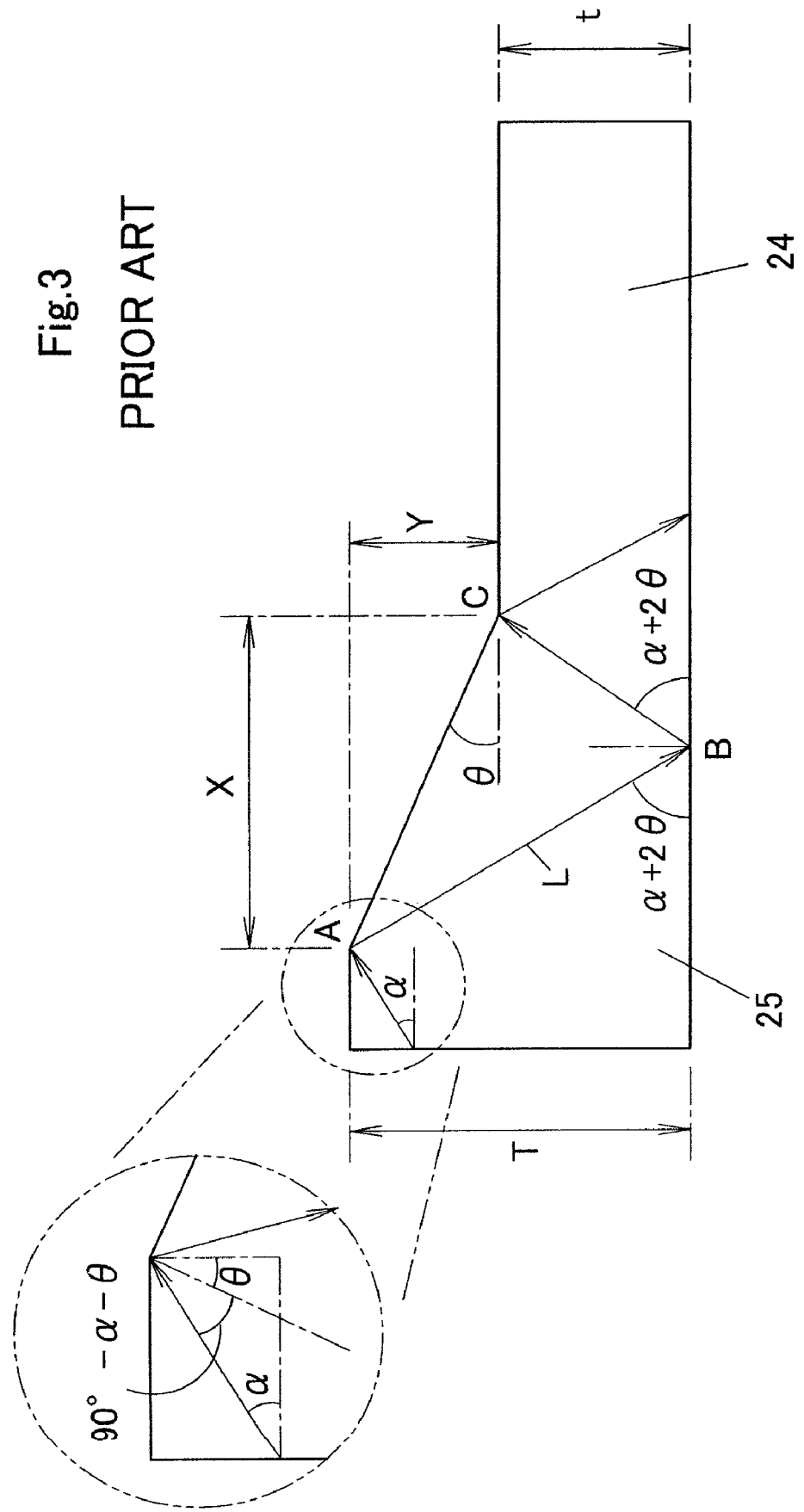
FIG. 3 is a drawing that depicts dimensions of the surface light source device for use in the liquid crystal display device of FIG. 2 and a behavior of light.
Figure 5:
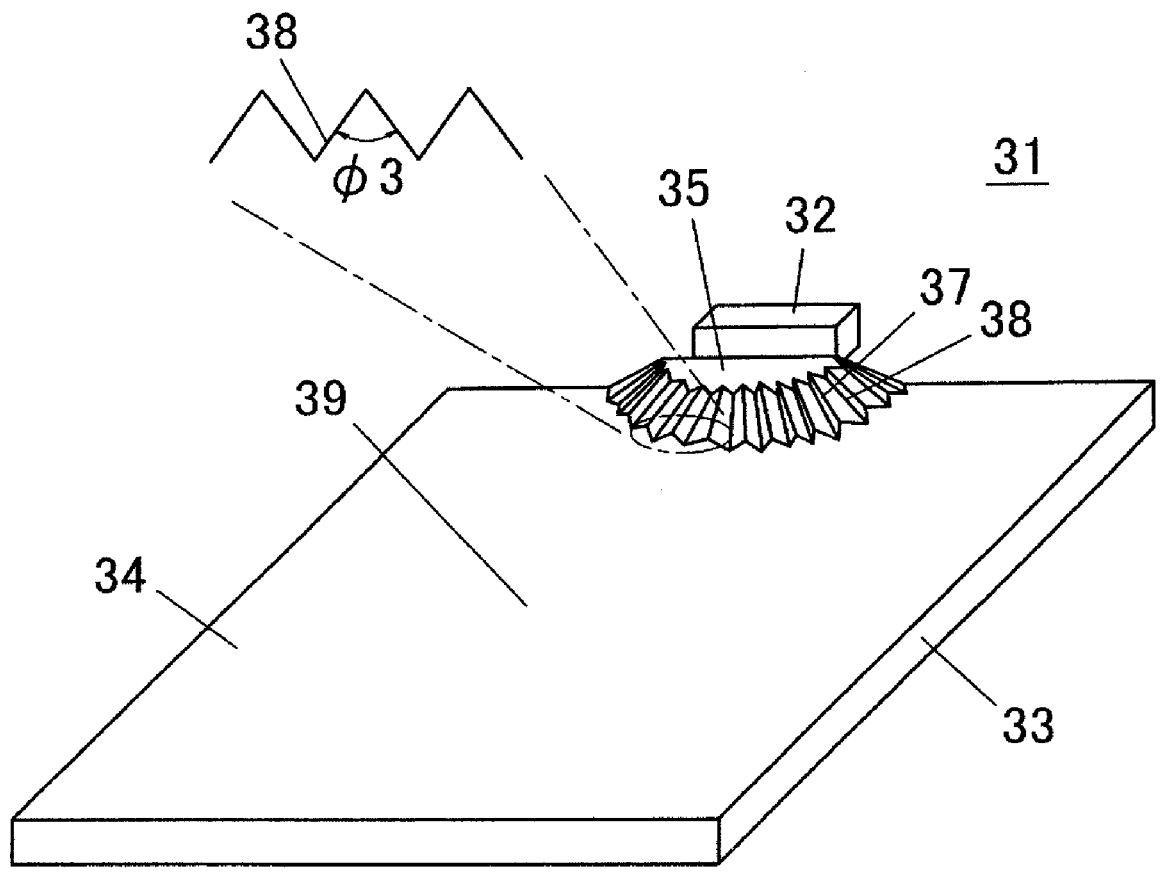
FIG. 5 is a perspective view of a surface light source device disclosed in Patent Document 4.
Figure 6:
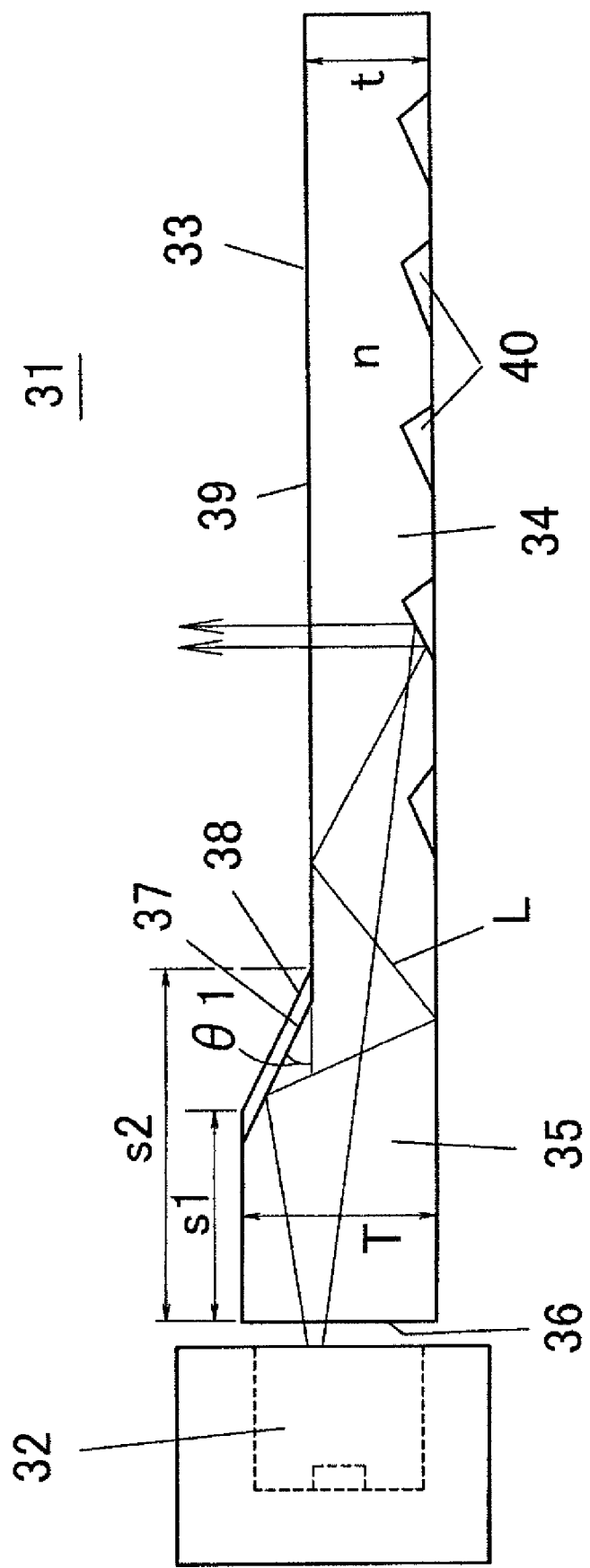
FIG. 6 is a drawing that depicts a behavior of light in the surface light source device of FIG. 5.
Figure 8:
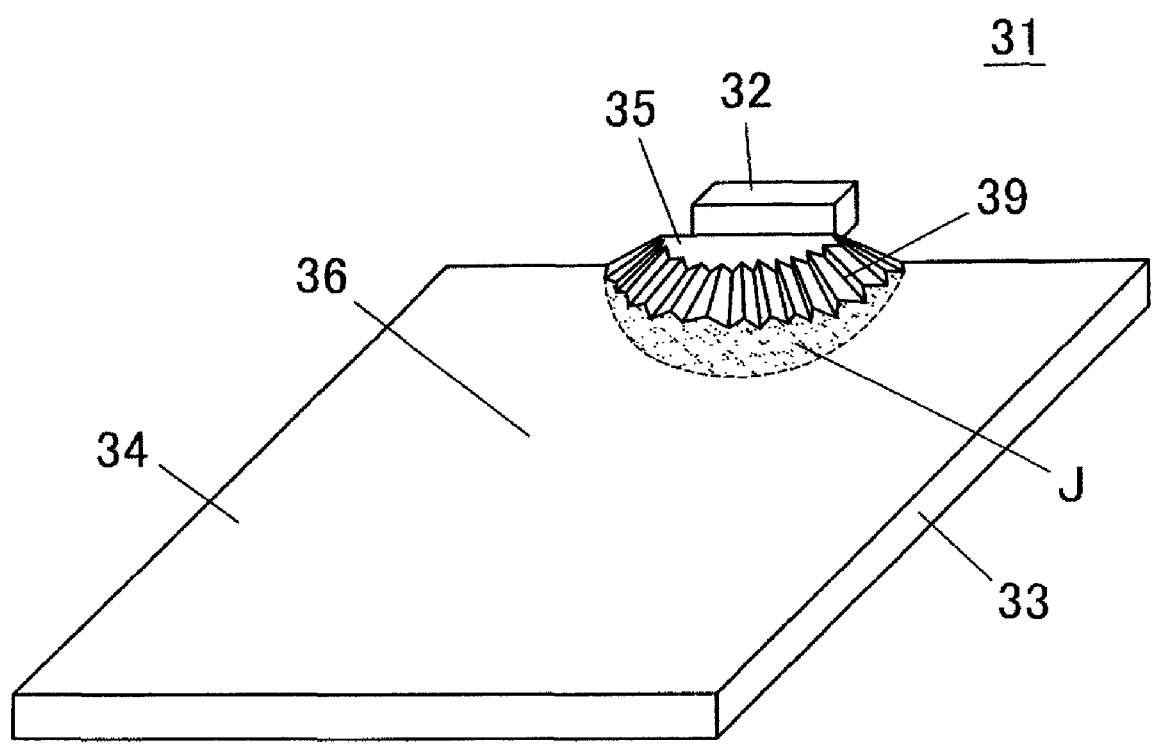
FIG. 8 is a schematic drawing depicting the state in which a light emission region with high luminance occurs on an edge of a light introducing unit in the surface light source device of FIG. 5.

DESCRIPTION OF REFERENCE NUMERALS 61 surface light source device
62 point source of light 62a light emission window
63 light guide plate
64 light guide plate body
65 light introducing unit
66 light incident end face
67 inclined surface
68 directivity conversion pattern
68a V-groove structures
69 light emission surface
70 light emitting means
71, 71a, 71b auxiliary inclined surface
76, 81, 86, 88, 91, 101, 106, 108, 111, 112, 121-126 surface light source device

BEST MODE FOR CARRYING OUT THE INVENTION

In the following, preferred embodiments of the present invention are described with reference to the attached drawings.

First Embodiment

Figure 9:
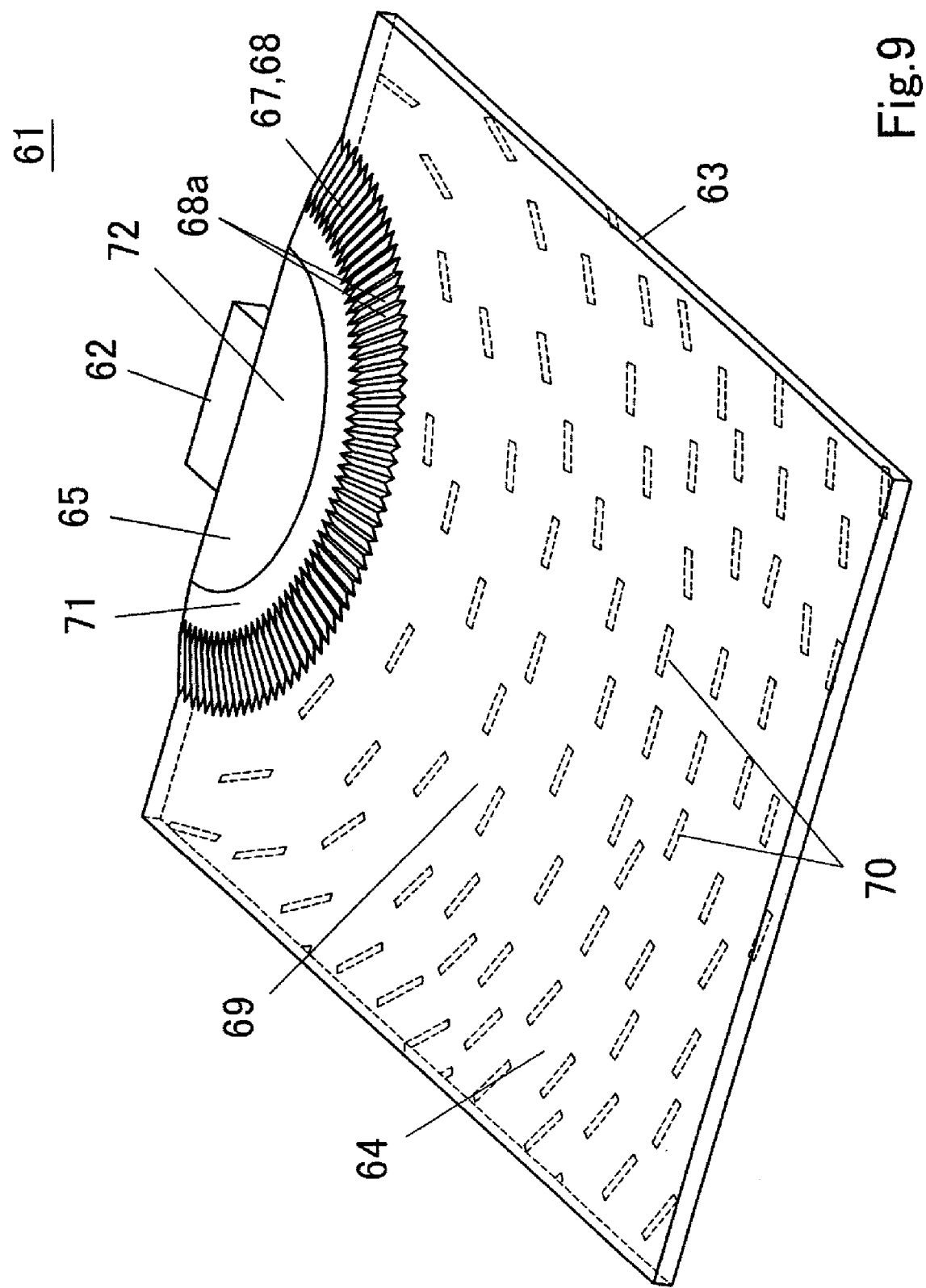
FIG. 9 is a perspective view of a surface light source device according to a first embodiment of the present invention.
Figure 10:
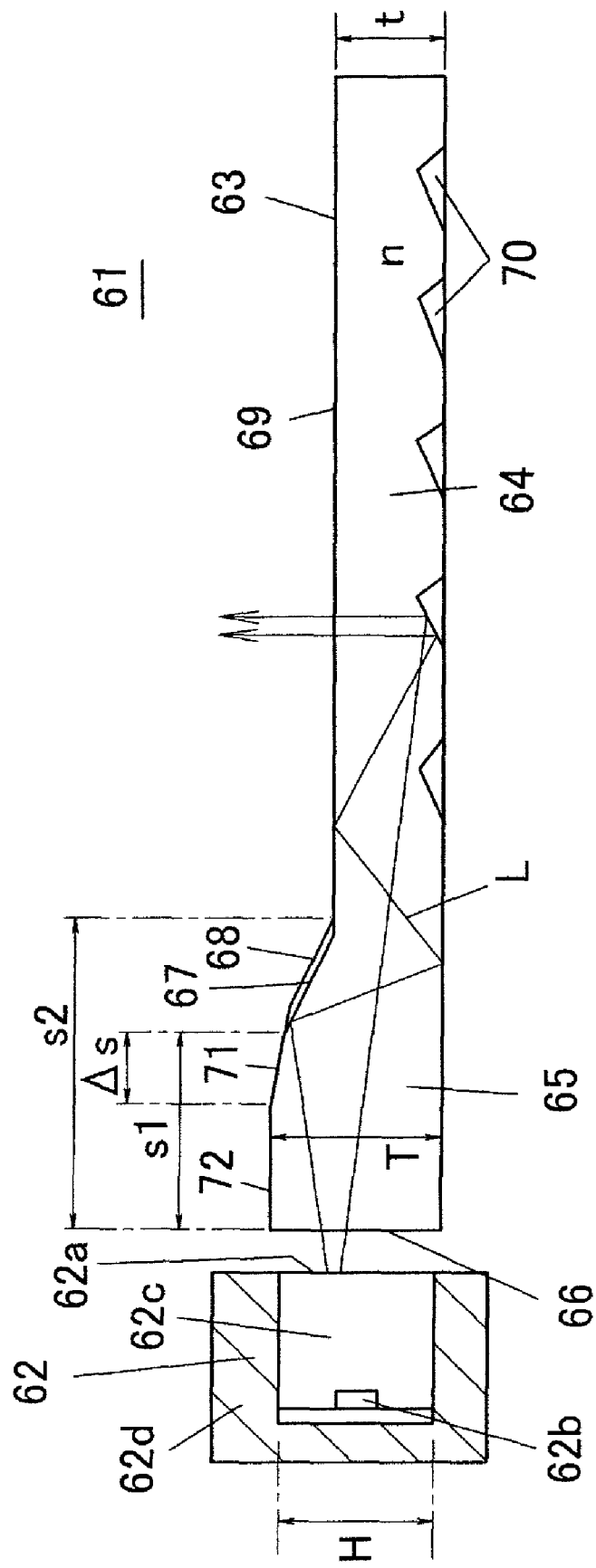
FIG. 10 is a schematic sectional view of the surface light source device according to the first embodiment.

A surface light source device according to a first embodiment of the present invention is described. FIG. 9 is a perspective view of a surface light source device 61 according to a first embodiment of the present invention, and FIG. 10 is a schematic sectional view thereof. The surface light source device 61 includes a point source of light 62 and a light guide plate 63. The point source of light 62 has one or a plurality of LEDs 62b incorporated therein, emitting white light. The LED(s) 62b is sealed in a transparent sealing resin 62c and, furthermore, the transparent sealing resin 62c is covered with a white resin 62d excluding a front portion. The front portion exposed from the white resin 62d of the transparent sealing resin 62c forms a light emission window 62a. This point source of light 62 is small compared with the width of the light guide plate 63 (dimensions in a depth direction on paper in FIG. 10), and is thus called a point source of light, as opposed to a cold-cathode tube being called a linear source of light.

Note that the point source of light is not a point source of light in the strict sense. The point source of light also has a finite width but, unlike the cold-cathode tube, does not have a width equal to or larger than 10 mm. For example, as a point source of light, a side-view-type LED can be used. One or more LED chips may be contained in one package and a plurality of LED chips may be sealed all together. A point source of light having a plurality of chips contained all together may have an opening size in a width direction on the order of 5 mm, but is still sufficiently small compared with a light guide plate having a size of a light emission surface on the order of two inches, and therefore can be regarded as a point source of light. Also, a point source of light may be able to emit parallel light, such as a semiconductor laser device. Furthermore, light guided by using an optical fiber may be introduced to the light guide plate. In this case, a light emission end face of the optical fiber can be regarded as a point source of light.

The light guide plate 63 is formed by providing a light introducing unit 65 at an end of a light guide plate body 64, and is molded of a transparent resin having a high refractive index, such as acrylic resin, polycarbonate resin (PC), cycloolefin-type material, or polymethyl methacrylate (PMMA). In the following, it is assumed that the light guide plate 63 is made of polycarbonate resin.

The light introducing unit 65 corresponds to a portion of the light guide plate 63 having a thick thickness, and its end face forms a light incident end face 66, which the point source of light 62 faces. Also, the light incident end face 66 of the light introducing unit 65 has a thickness T equal to or thicker than a height H of the light emission window 62a (T≧H). Therefore, light emitted from the point source of light 62 efficiently enters the inside of the light introducing unit 65 from the light incident end face 66, thereby increasing light use efficiency of the surface light source device 61.

In the light introducing unit 65, a protruding portion in a shape of an approximately half of a frustum of a cone protrudes from a surface of the light guide plate body 64 on the same side as that of a light emission surface 69 to increase the thickness of the light introducing unit 65. A curved outer perimeter surface of the protruding portion forms an inclined surface 67 (a first inclined surface). On this inclined surface 67, a directivity conversion pattern 68 is formed. Furthermore, inside of the inclined surface 67, an auxiliary inclined surface 71 (a second inclined surface) is formed as a smooth curved surface along an inner perimeter edge of the inclined surface 67 from end to end. The inclined surface 67 and the auxiliary inclined surface 71 each have a constant angle of inclination for the entire perimeter of the protruding portion of the light introducing unit 65. The auxiliary inclined surface 71 has an inclination milder than that of the inclined surface 67. As depicted in FIG. 11(a), when an angle of inclination of the inclined surface 67 is taken as θ1 and an angle of inclination of the auxiliary inclined surface 71 is taken as θ2, both measured from a horizontal plane, the angle of inclination θ2 of the auxiliary inclined surface 71 is smaller than the angle of inclination θ1 of the inclined surface 67 (θ2<θ1). An upper surface 72 of the light introducing unit 65 positioned on an inner perimeter side of the auxiliary inclined surface 71 is a flat surface parallel to a horizontal plane, that is, the light emission surface 69. Note that the angle of inclination θ1 of the inclined surface 67 where the directivity conversion pattern 68 is formed can be redefined as an angle of inclination of an envelope surface of the directivity conversion pattern 68.

When viewed from a direction perpendicular to the light emission surface 69, the directivity conversion pattern 68 forms a band-shaped region in an arc shape, where V-groove structures 68a having the same shape are radially arranged. When a length direction of each V-groove structure 68a is extended, respective extended lines are gathered near a certain point above the center portion of the end face of the light introducing unit 65. In three dimensions, when ridgelines and valley lines of the V-groove structures 68a are extended upward, respective extended lines are gathered near a certain point.

The light guide plate body 64 occupies most of the area of the light guide plate 63, and has the thickness t thinner than the thickness T of the light introducing unit 65 (t<T). With this, reduction in thickness of the light guide plate 63 can be achieved. On a back surface positioned oppositely to the light emission surface 69 of the light guide plate body 64, light emitting means 70 are provided. FIG. 9 and FIG. 10 show patterns each having a triangular groove shape concentrically arranged as the light emitting means 70. Alternatively, the means may be those subjected to sandblasting, those formed by photographic printing of diffusion ink, diffraction grating patterns, arbitrary asperity patterns, those with a surface of the light guide plate body 64 opposite to the light emission surface 69 being inclined (a wedge-shaped light guide plate body), and others. Also, the light emitting means 70 may be provided on the light emission surface 69 or on both of the light emission surface 69 and its opposite surface. The light emitting means 70 have a relatively small distribution density near the point source of light 62. As the distance from the point source of light 62 increases, the distribution density gradually increases.

As such, in this surface light source device 61, as depicted in FIG. 10, light L emitted from the point source of light 62 enters the inside of the light introducing unit 65 from the light incident end face 66, and is totally reflected off the directivity conversion pattern 68, the auxiliary inclined surface 71, and lower surfaces of the light introducing unit 65 or passes through the light introducing unit 65 to be guided to the light guide plate body 64 having a thin thickness. The light L guided to the light guide plate body 64 is totally reflected or diffused by the light emitting means 70 to be emitted approximately uniformly from the entire light emission surface 69.

Here, since the light introducing unit 65 having a thick thickness and the light guide plate body 64 having a thin thickness are connected via the inclined surface 67, light of the point source of light 62 entering the light introducing unit 65 that enters the inclined surface 67 is totally reflected off the inclined surface 67, and is guided to the light guide plate body 64 at a light guide angle smaller than that before entry into the inclined surface 67. Therefore, with the provision of the inclined surface 67, light leaking between the light introducing unit 65 and the light guide plate body 64 can be suppressed to improve light use efficiency.

However, even when the light introducing unit 65 is provided with the inclined surface 67, if the angle of inclination θ1 of the inclined surface 67 is increased (for example, when the angle of inclination θ1 becomes approximately 15.3°), it becomes difficult to sufficiently suppress leaked light only with the inclined surface 67. Therefore, in the surface light source device 61 of the present embodiment, the directivity conversion pattern 68 is provided to the inclined surface 67 to change directivity of light totally reflected off the directivity conversion pattern 68 (the inclined surface 67). Even when the angle of inclination θ1 of the inclined surface 67 is large, the amount of light leaking from the inclined surface 67 can be decreased.

Note that the directivity conversion pattern 68 configured of the V-groove structures 68a converts a directivity spread of light entering the light introducing unit 65 in a thickness direction of the light guide plate to a directivity characteristic inclined toward a direction parallel to a surface direction of the light guide plate 63. With this, even when the angle of inclination of the inclined surface 67 is large to some extent, the inclined surface 67 or the directivity conversion pattern 68 causes light leakage to be less prone to occur, and the light entering the light introducing unit 65 is efficiently fed to the light guide plate body 64. Such an operation of the directivity conversion pattern 68 configured of the V-groove structures 68a are described in detail in Patent Document 4 (in particular, paragraphs 0053-0108, FIGS. 11-37), and therefore the description in Patent Document 4 is incorporated and not described in detail herein.

Also, even with the inclined surface 67 and the directivity conversion pattern 68 are provided, as described in the description regarding Patent Document 4, when the size of the light introducing unit 65 is decreased, light leaks from the edge of the directivity conversion pattern 68 to decrease light use efficiency. By contrast, in the surface light source device 61 of the present embodiment, since the auxiliary inclined surface 71 is provided, even when the size of the light introducing unit 65 is decreased, light leakage can be decreased. The reason for this is described with reference to FIGS. 11(a) and 11(b).

FIGS. 11(a) and 11(b) schematically depict a part of the surface light source device 61 of the present embodiment having the auxiliary inclined surface 71, and a behavior of light at that time is represented by a solid line L2. Also, like the surface light source device disclosed in Patent Document 4, the case without the auxiliary inclined surface 71 is represented by a two-dot chain line, and a behavior of light at this time is represented by a broken line L1.

Figure 11:
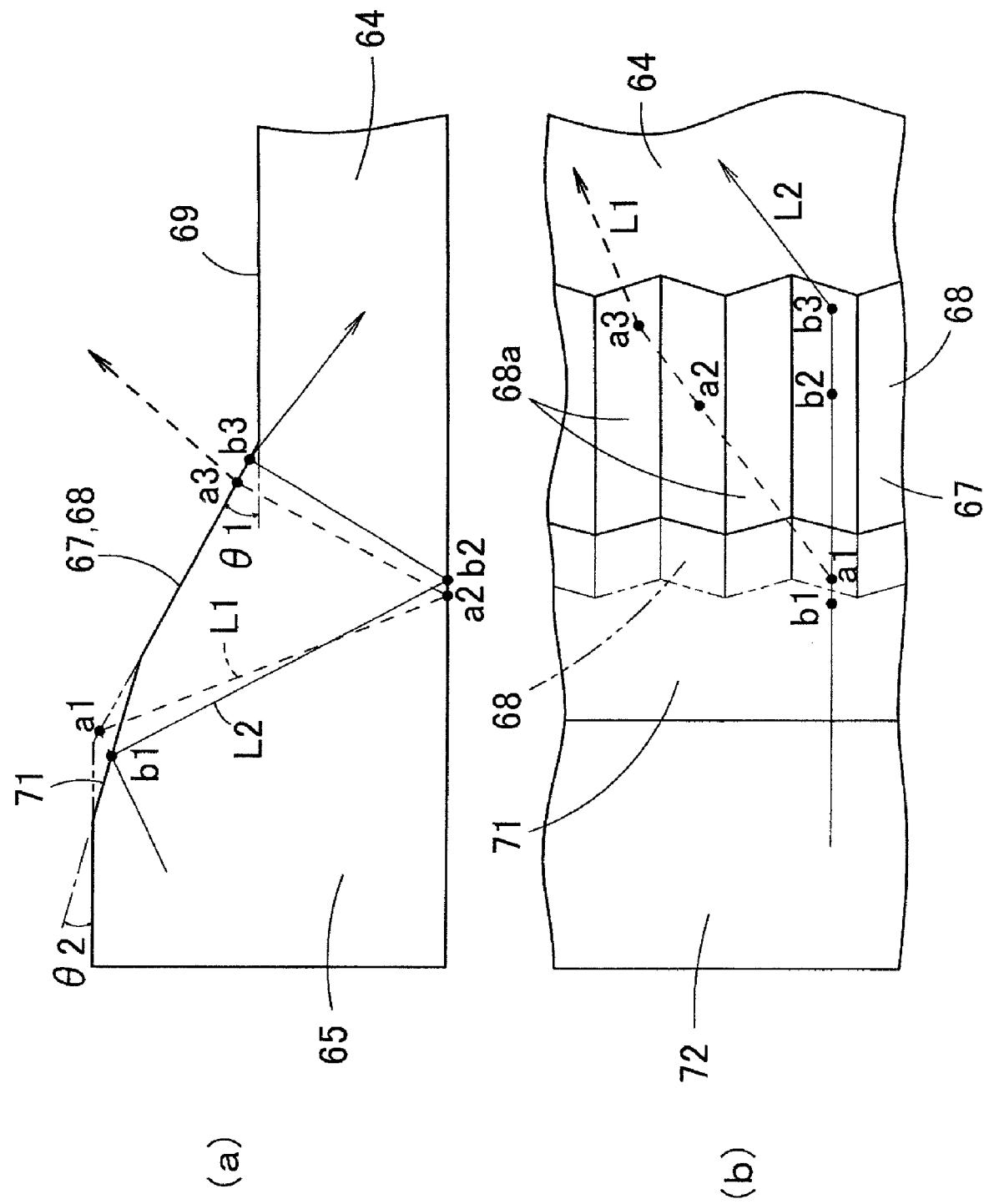
FIGS. 11(a) and 11(b) are a partially-broken sectional view and a plan view, respectively for describing the state in which light leaks from the directivity conversion pattern when an auxiliary inclined surface is not provided and light does not leak from the directivity conversion pattern when an auxiliary inclined surface is provided.

In the case of the surface light source device without the auxiliary inclined surface 71, when the directivity conversion pattern 68 is decreased (for example, when a half-width expected angle ξ becomes 30°), there are some light, such as the light L1 represented by the broken line in FIGS. 11 (a) and 11 (b), that is totally reflected off a point a1 of the directivity conversion pattern 68 to deviate horizontally and is then totally reflected off a point a2 on the lower surface of the light introducing unit 35 to enter the directivity conversion pattern 68 again. The light L1 entering the directivity conversion pattern 68 in this manner for the second time enters the V-groove structures 68a of the directivity conversion pattern 68 at a small angle of incidence, and therefore passes through a point a3 of the directivity conversion pattern 68 to leak to the outside of the light guide plate 63, thereby degrading light use efficiency and also causing the edge of the light introducing unit 35 to glow.

By contrast, in the case of the surface light source device 61 of the present embodiment, the light described above is totally reflected off the auxiliary inclined surface 71. That is, with the provision of the auxiliary inclined surface 71, the light, which is totally reflected off the point a1 of the directivity conversion pattern 68 in the above case, is totally reflected off a point b1 of the auxiliary inclined surface 71. The light totally reflected off the point b1 is totally reflected off a point b2 of lower surfaces of the light introducing unit 35 to enter a point b3 of the directivity conversion pattern 68. The light totally reflected off the point b3 deviates horizontally, but enters the inside of the light guide plate body 64 without entering the directivity conversion pattern 68 again, and therefore does not leak from the light introducing unit 65. Therefore, according to the surface light source device 61 of the present embodiment, even when the size of the light introducing unit 65 is decreased, light leakage can be decreased, thereby increasing light use efficiency.

Also, since the angle of incidence θ2 of the auxiliary inclined surface 71 is smaller than the angle of incidence θ1 of the inclined surface 67, a light guide angle formed by light totally reflected off the auxiliary inclined surface 71 and measured from a horizontal plane is decreased compared with the case of total reflection off the inclined surface 67, and light is much less prone to leak from the light guide plate 63. Furthermore, although the thickness of the light introducing unit 65 is thin compared with the case where the auxiliary inclined surface 71 is also made as a horizontal plane, with the provision of the auxiliary inclined surface 71, the thickness of the light introducing unit 65 can be made thick (in other words, with the same thickness of the light introducing unit 65, the thickness of the light guide plate body 64 can be made thin).

Therefore, according to the surface light source device 61 of the present embodiment, with the provision of the auxiliary inclined surface 71, light leakage can be decreased even when a half-width expected angle, namely an angle between lines from the center g of the inner perimeter edge of the inclined surface 67 to one end f1 of the light emission window 62a and the center f0 thereof (refer to FIG. 7 and FIG. 13), becomes small. Therefore, a radius s1 of the inner perimeter edge of the inclined surface 67 can be shortened. Also, with the provision of the directivity conversion pattern 68, even when the angle of the inclined surface 67 is increased, light leakage can be decreased. Therefore, a horizontal length Δs of the inclined surface 67 can be shortened. With this, s1 and Δs can be shortened, resulting in a decrease of a radius s2=s1+Δs of an outer perimeter surface of the inclined surface 67 and a decrease of the occupied area of the light introducing unit 65. Therefore, according to the surface light source device 61 of the present embodiment, a dead space of the light guide plate 63 can be decreased.

Also, according to the surface light source device 61 of the present embodiment, light leakage can be suppressed even when the angle of incidence θ1 of the inclined surface 67 is increased or the half-width expected angle formed when viewed from the inner perimeter edge of the inclined surface 67 to the light emission window 62a is increased to decrease the size of the light introducing unit 65. Therefore, it is possible to sustain or improve light use efficiency while decreasing the dead space of the light guide plate 63. Thus, the luminance of the light emission region of the surface light source device 61 can be increased, and the light emission region J with a high luminance occurring at the edge of the light introducing unit 65 can be suppressed to a degree that it is visually unrecognizable.

Next, an example of an optimum design is described. When the vertical angle of the mountain-shaped portion when viewed from a ridgeline direction of the V-groove structure 68a (a maximum included angle formed by planes between adjacent V-groove structures 68a) φ3 is 120°, an effect of preventing light leakage through directivity conversion by the directivity conversion pattern 68 is maximum. Also, when the vertical angle φ3 is 100° to 140°, leaked light/incident light≦20% can be satisfied. Furthermore, when the vertical angle φ3 is 110° to 130°, leaked light/incident light≦15% can be satisfied.

Also, since the refractive index of a general transparent material (light guide plate material) is equal to or smaller than 1.7, when the refractive index of the light guide plate is n=1.7, a condition for preventing incident light from the point source of light 62 from leaking from the auxiliary inclined surface 71 is θ2<90°−2×arcsin(1/n)=18°, where θ2<θ1. Also, when a horizontal length from the inner perimeter edge to the outer perimeter edge of the auxiliary inclined surface 71 is taken as Δs, naturally, Δs<(T−t)×tan θ2.

With reference to FIG. 10 and FIG. 11, specific numerical values are as follows:
the vertical angle of each mountain-shaped portion of the directivity conversion pattern 68: φ3=120°;
the thickness of the end face of the light introducing unit 65: T=0.31 mm;
the thickness of the light guide plate body 64: t=0.18 mm (the difference in thickness: T−t=0.13 mm);
the angle of inclination of the inclined surface 67: θ1=15.3°;
the angle of inclination of the auxiliary inclined surface 71: θ2=4°;
the length from the center of light incident end face 66 to the inner perimeter edge of the directivity conversion pattern 68: s1=2.94 mm;
the horizontal length from the inner perimeter edge to the outer perimeter edge of the auxiliary inclined surface 71: Δs=0.9 mm; and
the length from the center of the light incident end face 66 to the outer perimeter edge of the directivity conversion pattern 68: s2=3.19 mm.

Figure 12:
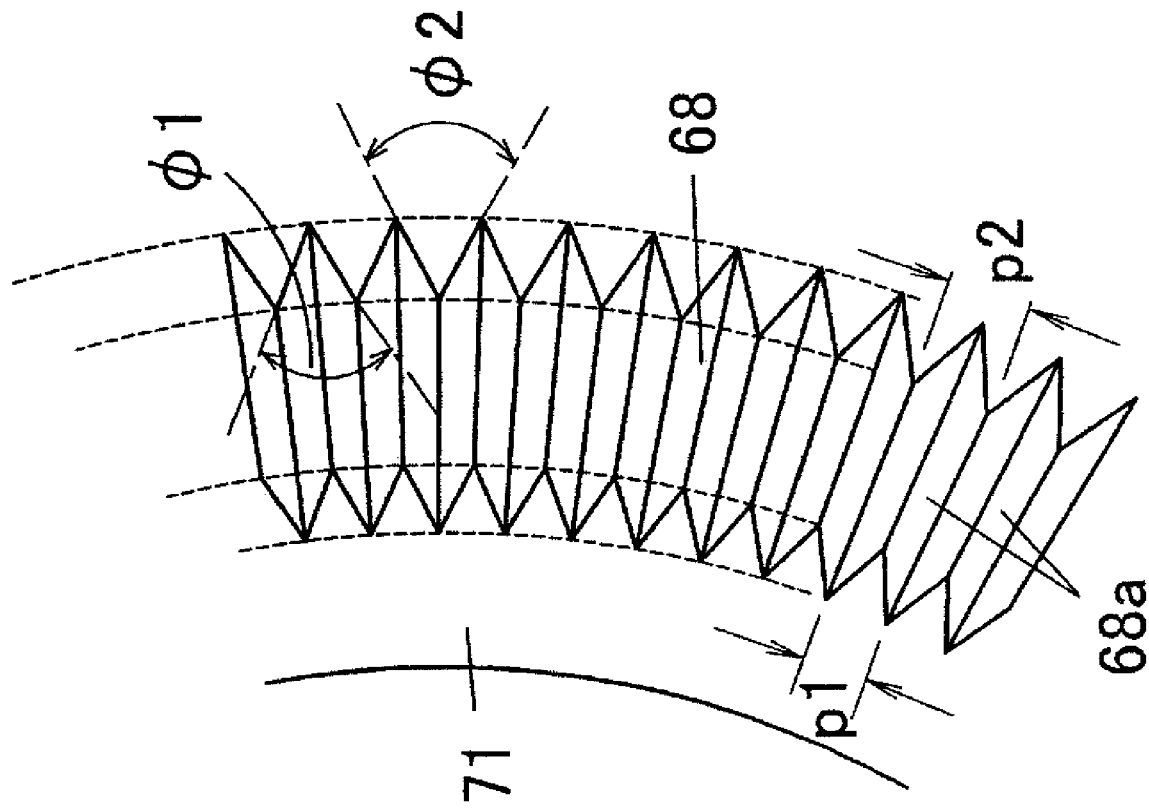
FIG. 12 is a partially enlarged view of the directivity conversion pattern.

Also, as depicted in FIG. 12, a pitch p1 of the V-groove structure 68a on an upper end side is 0.17 mm, and a pitch p2 of the V-groove structure 68a on a lower end side is 0.20 mm. Furthermore, a vertical angle φ1 of the mountain-shaped portion at a lower end of the V-groove structure 68a in a planar view is 50°, and a vertical angle φ2 of the valley portion at the lower end of the V-groove structure 68a in a planar view is 46.5°

Figure 13:
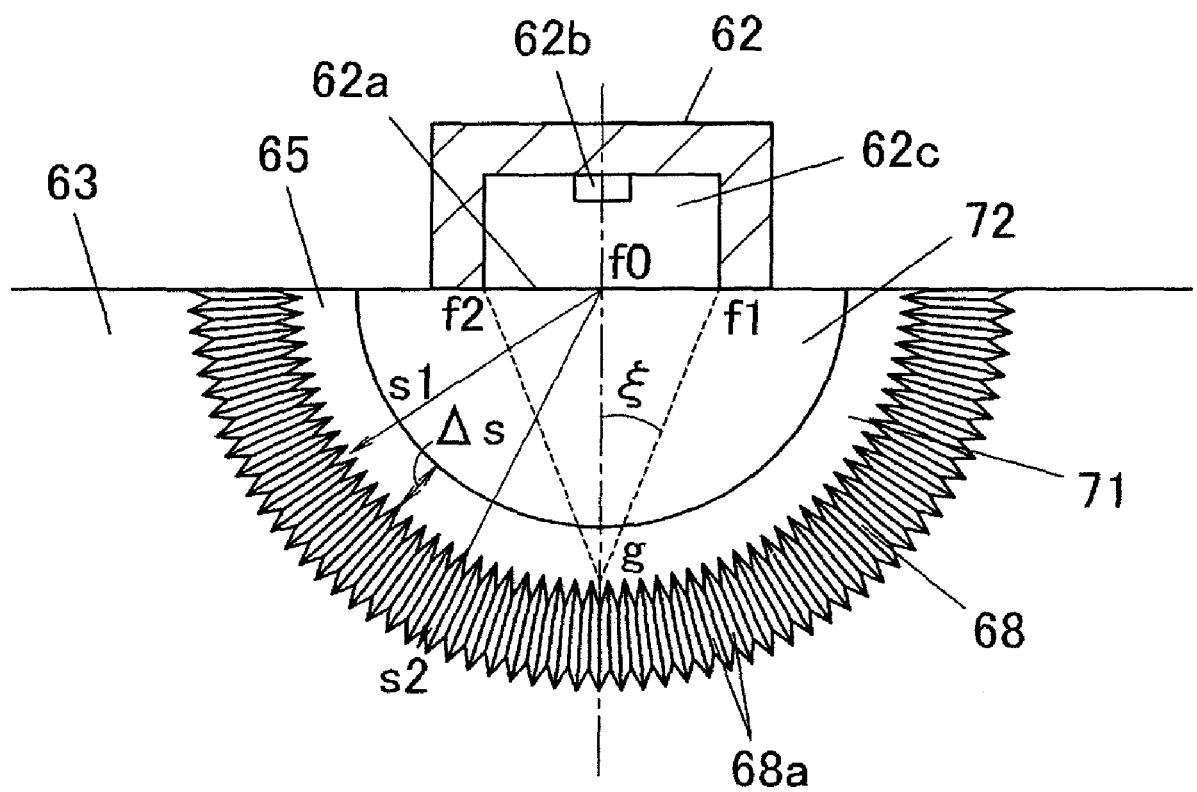
FIG. 13 is an enlarged plan view of a light introducing unit in the first embodiment.

In the surface light source device 61 having such dimensions, as depicted in FIG. 13, when an angle ξ (a half-width expected angle) formed by a line segment connecting one end f1 of the light emission window 62a of the point source of light 32 and a center g of an edge of the directivity conversion pattern 68 on an inner perimeter side and a line segment connecting a center f0 of the light emission window 32a and the center g of the edge of the directivity conversion pattern 38 on the inner perimeter side is assumed to be 30°, in the surface light source device of Patent Document 4, leaked light account for approximately 15%. In the surface light source device 61 of the present embodiment, leaked light accounted for approximately 8%. Thus, leaked light was reduced by half, and light use efficiency was significantly improved. Also, an effect of preventing the edge of the light introducing unit 65 to glow was able to be visually confirmed. That is, the edge of the light introducing unit 65 did not glow.

Also, when the half-width expected angle ξ was set at 35°, in the surface light source device 61 of the present embodiment, leaked light accounted for approximately 15%. Thus, when light use efficiency is the same as that in the case of ξ=30° in the surface light source device of Patent Document 4, the area of the light introducing unit 65 can be decreased to further decrease the dead space of the light guide plate 63. Alternatively, when in the case of ξ=35° in the surface light source device of Patent Document 4, since leaked light accounts for approximately 25%, light leakage can be decreased in the surface light source device 61 of the present embodiment if the area of the light introducing unit 35 is the same, thereby improving light use efficiency.

Modification Example of First Embodiment

Figure 14:
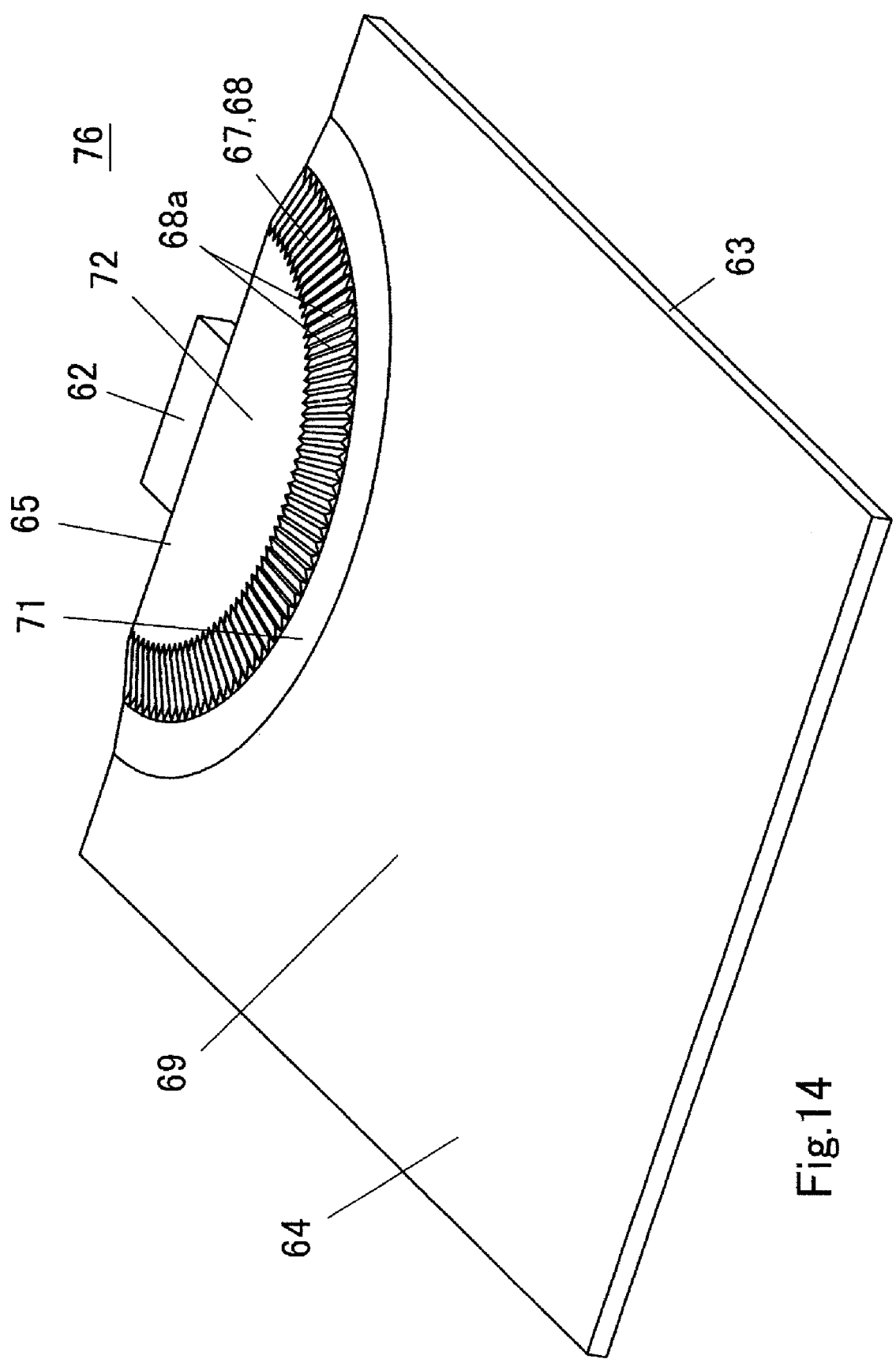
FIG. 14 is a perspective view of a surface light source device according to a modification example of the first embodiment.
Figure 15:
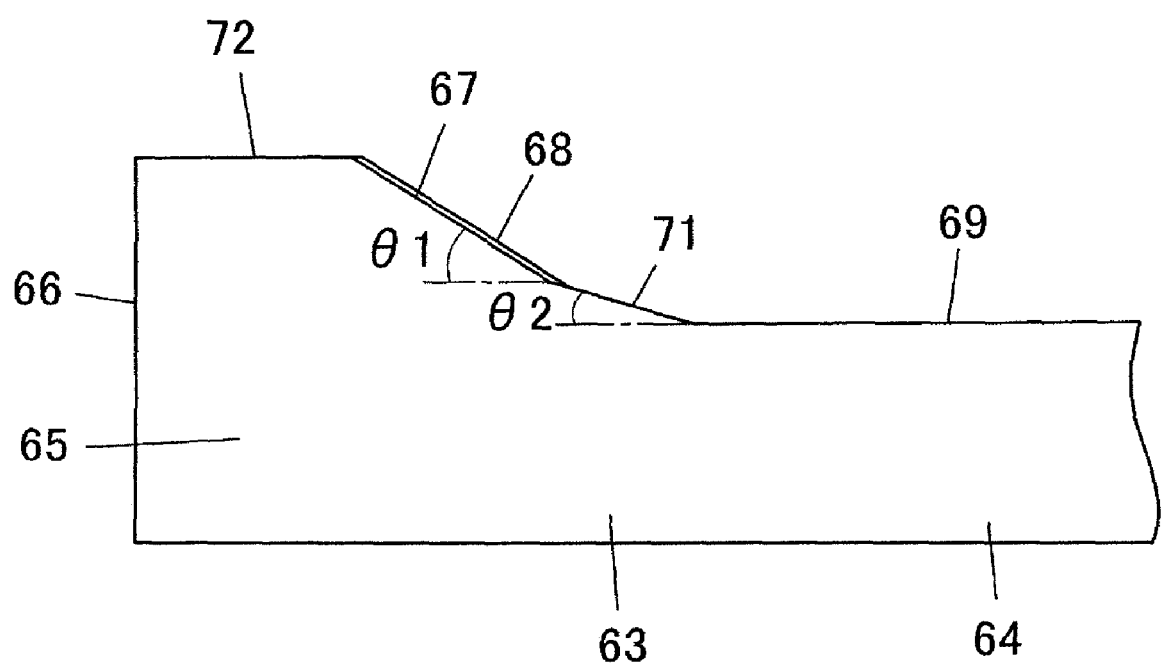
FIG. 15 is a partially-broken schematic sectional view of the surface light source device according to the modification example of the first embodiment.
Figure 16:
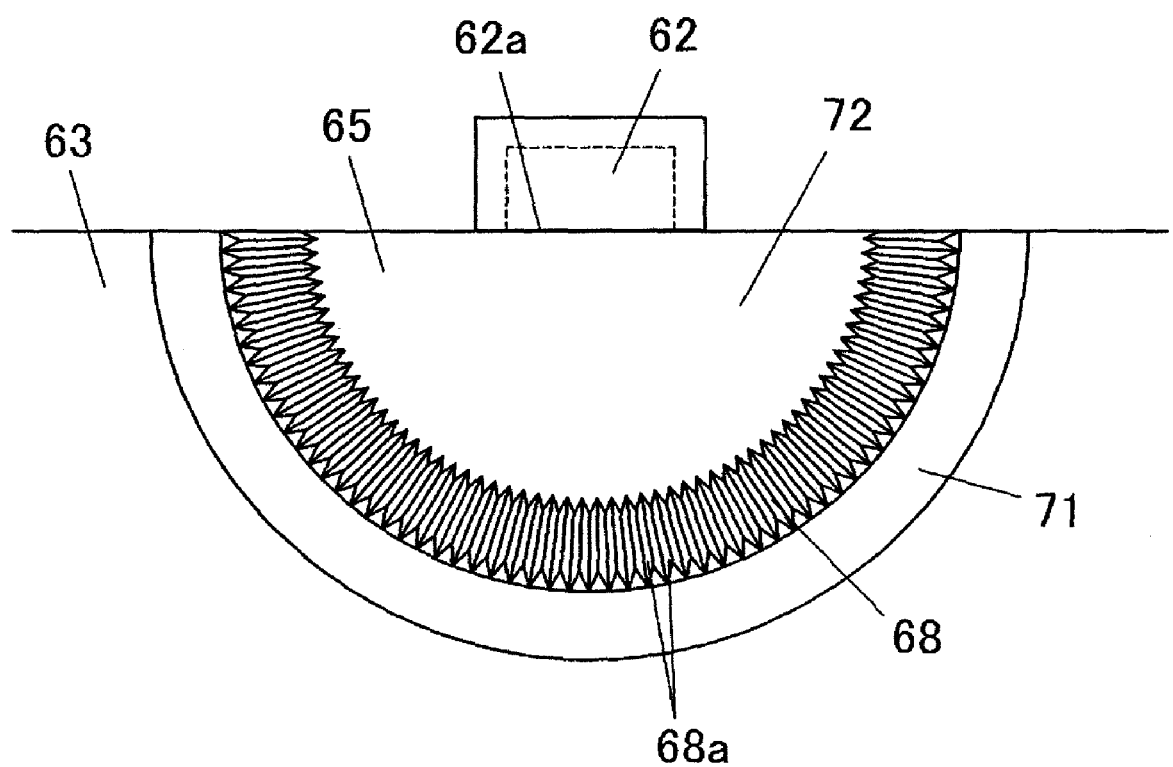
FIG. 16 is an enlarged plan view of a light introducing unit in the modification example of the first embodiment.

FIG. 14 is a perspective view of a surface light source device 76 according to a modification example of the first embodiment, and FIG. 15 is a partially-broken schematic sectional view of the surface light source device 76. Also, FIG. 16 is a plan view of a light introducing unit 35 of the surface light source device 76.

In the first embodiment, the auxiliary inclined surface 71 is provided adjacently to an inner perimeter side of the directivity conversion pattern 68. In this modification example, the auxiliary inclined surface 71 is provided adjacently to an outer perimeter side of the directivity conversion pattern 68. Also in this modification example, a relation between the half-width expected angle ξ and a ratio of leaked light is similar to that of the first embodiment. Note that also in this modification example, when a horizontal length from the inner perimeter edge to the outer perimeter edge of the auxiliary inclined surface 71 is taken as Δs, naturally, Δs<(T−t)×tan θ2.

In this modification example, since a portion at the point a3 in FIG. 11(b) forms the auxiliary inclined surface 71, light leakage can be eliminated, thereby improving light use efficiency and suppressing light leakage from the edge of the light introducing unit 35. However, when the auxiliary inclined surface 71 is provided on an outer perimeter side of the directivity conversion pattern 68, the area of the light introducing unit 65 including the auxiliary inclined surface 71 is increased, and the dead space of the light guide plate 63 is increased. Therefore, the auxiliary inclined surface 71 is preferably provided on an inner perimeter side of the light introducing unit 65.

Second Embodiment

In the surface light source device 61 of the first embodiment, the auxiliary inclined surface 71 is provided for the entire perimeter of the light introducing unit 35, that is, in a range of 180°, but is not necessarily required to be provided for the entire perimeter of the light introducing unit 35 and can be provided in a certain range including the front. This reason is described below.

When the light incident end face 66 of the light guide plate 63 is a flat surface, a directivity spread of incident light is narrowed due to the refractive index of the light guide plate 63. For example, when the material of the light guide plate 63 is polycarbonate resin, its refractive index n=1.59, and a light directivity spread of light entering the light incident end face 66 is ±90°, a directivity spread of light entering the inside of the light introducing unit 65 is $$\pm\alpha=\pm\arcsin(1/1.59)=\pm39°.$$

Figure 17:
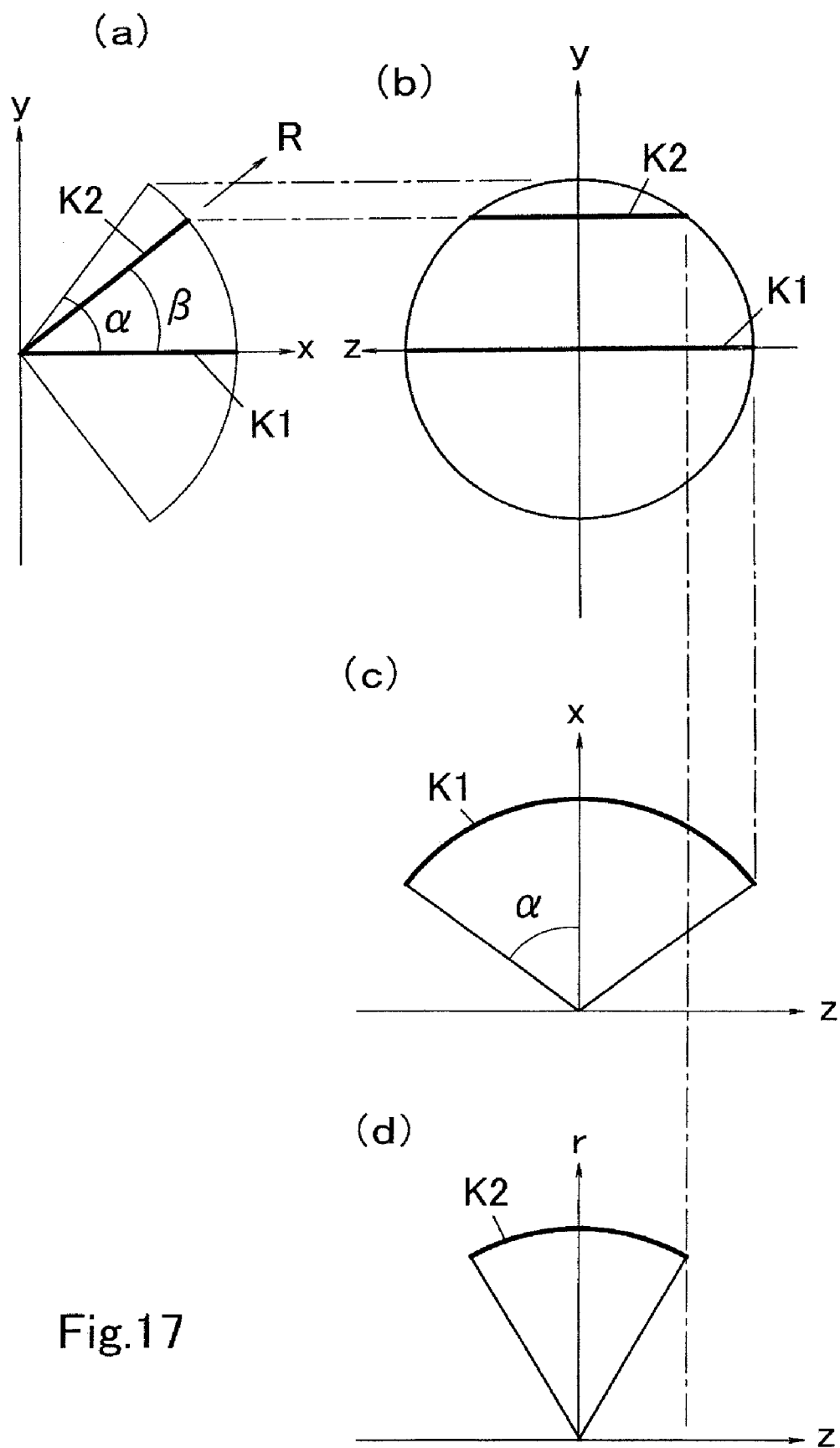
FIGS. 17(a) to 17(d) are drawings for describing directivities of light entering from a light incident end face to the inside of the light introducing unit.
Figure 18:
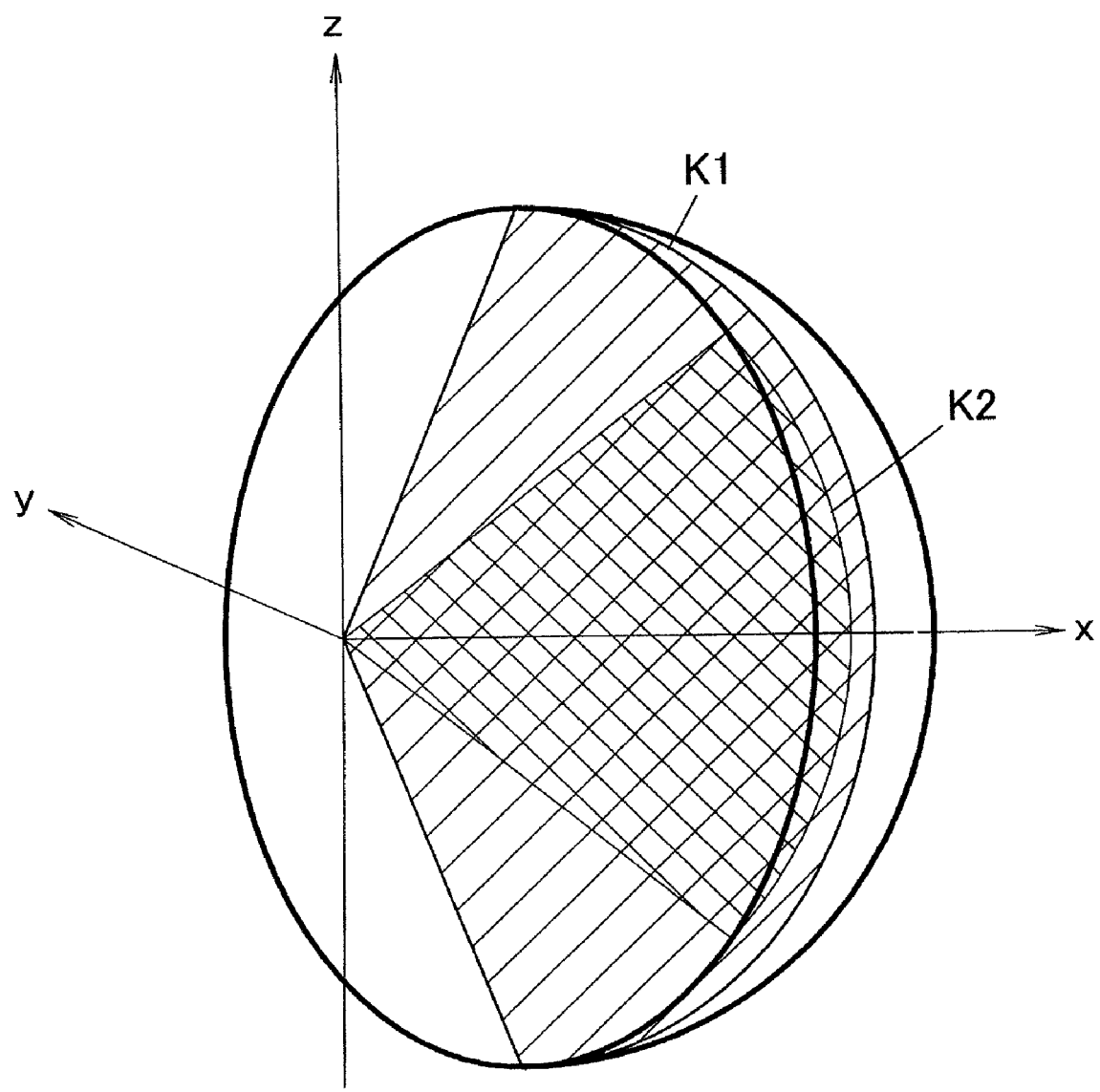
FIG. 18 is a drawing for describing directivity of light entering from a light incident end face to the inside of the light introducing unit.

Such a directivity spread inside the light introducing unit 65 is depicted in FIG. 17 and FIG. 18. Note in the specification that directivity is represented only in a light spreading direction, and a difference in intensity of light among respective directions is not considered. Also, a direction perpendicular to the light incident end face 66 is defined as an x-axis direction, a direction perpendicular to the light emission surface 69 is defined as a z-axis direction, and a direction orthogonal to the x-axis direction and the z-axis direction (a width direction of the light guide plate 63) is defined as a y-axis direction.

FIG. 17(a) depicts a directivity when viewed from the z-axis direction. The directivity when viewed from the z direction is ±α, and therefore light does not reach in a direction with an angle larger than α with respect to the x axis. Thus, the auxiliary inclined surface 71 is not required to be provided in a direction with an angle larger than α with respect to the x axis. Also, FIG. 17(b) depicts a directivity characteristic when viewed from the x-axis direction. FIG. 17(c) depicts a directivity K1 in a zx plane of FIG. 17(a), and FIG. 17(d) depicts a directivity K2 in an r-axis direction inclined from the x axis of FIG. 17(a) by an angle β. Also, FIG. 18 is a drawing that depicts this directivity in a stereoscopic manner. As depicted in FIGS. 17(a) to 17(d), the directivity in a plane perpendicular to a xy plane (the light emission surface 69) is maximum in the x-axis direction, is gradually decreased as the angle formed with the x axis is increased. In a direction at the angle α, the directivity spread is 0.

Thus, as for the auxiliary inclined surface 71 for preventing light from entering the inclined surface 67 a plurality of times, the horizontal length Δs can be made long in a front direction (the x-axis direction) according to changes of this directivity spread, and the length Δs can be gradually shortened as the inclination is increased from the front. Also, since the auxiliary inclined surface 71 is not required to be provided in a direction in which light cannot reach, the auxiliary inclined surface 71 may be provided only a partial area including a portion in a front direction.

However, the light spreading range α varies according to the refractive index of the light guide plate 63 or the state of the light incident end face 66. For example, when the light incident end face 66 has been subjected to diffusion processing or has a prism-shaped fine pattern formed thereon, the light spreading range α is wider than a value determined by the refractive index of the light guide plate 63. Also, to determine whether light can reach the position, a positional shift of the point source of light 62 and others are required to be taken into consideration.

Figure 19:
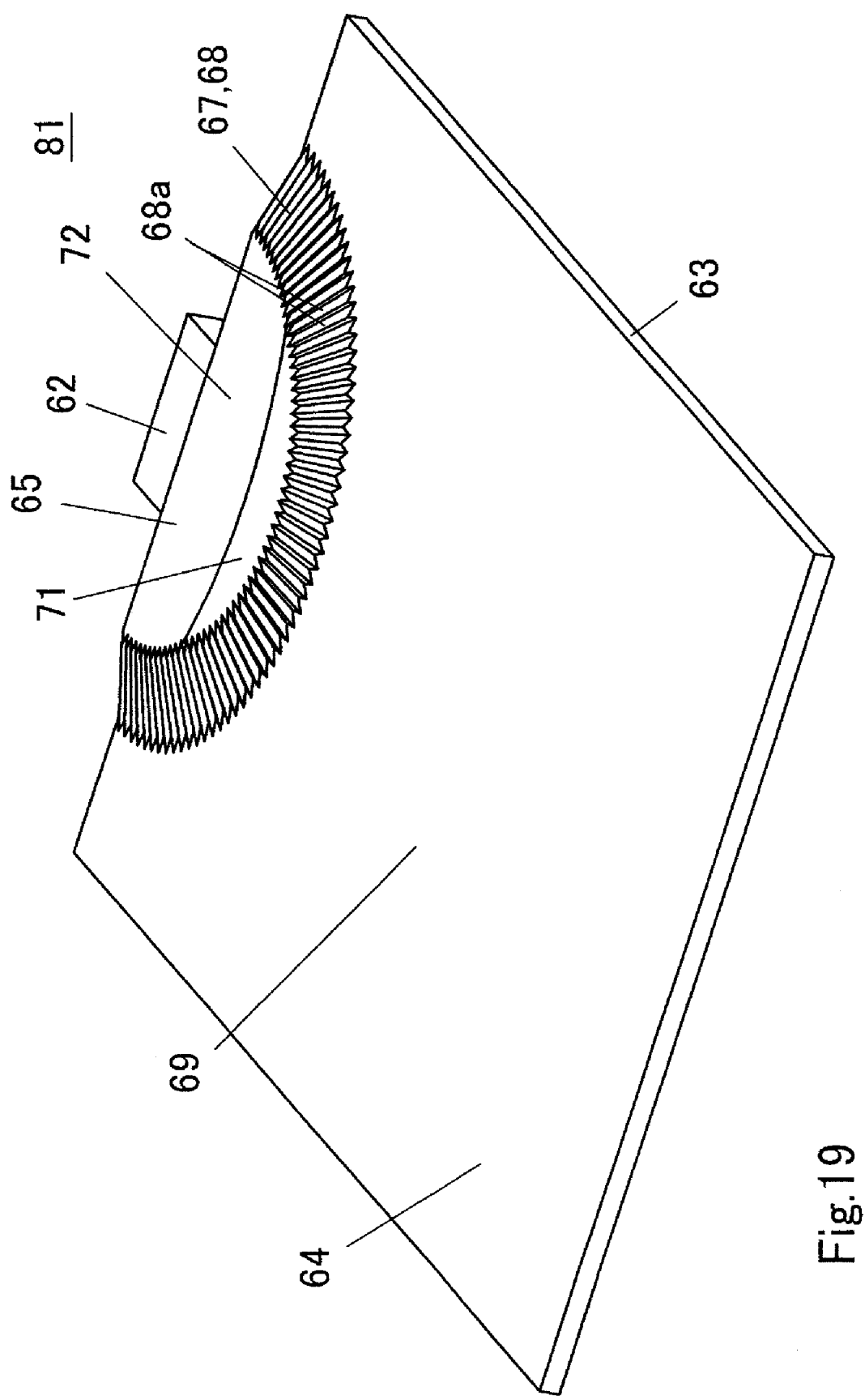
FIG. 19 is a perspective view of a surface light source device according to a second embodiment of the present invention.
Figure 20:
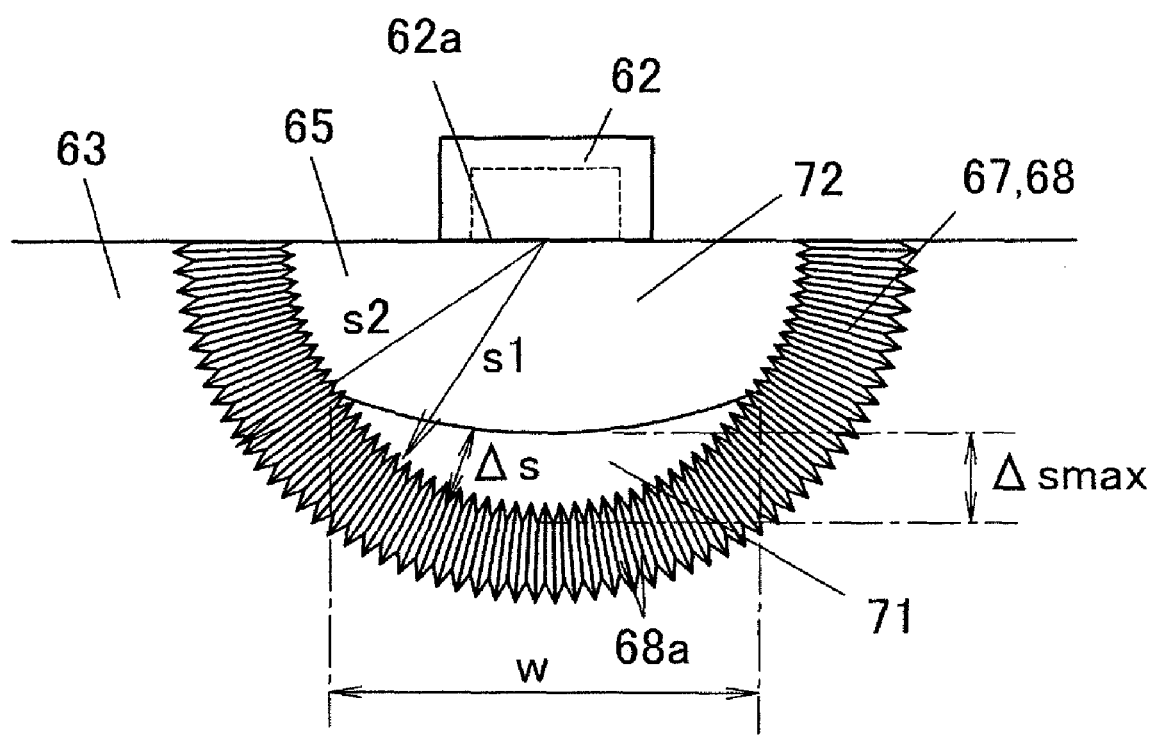
FIG. 20 is an enlarged plan view of a light introducing unit in the second embodiment.

FIG. 19 is a perspective view of a surface light source device 81 according to a second embodiment of the present invention, and FIG. 20 is an enlarged plan view of its light introducing unit 65. The surface light source device 81 of the second embodiment is based on the study as described above. The auxiliary inclined surface 71 is provided only a part including the front of the point source of light 62 along the inner perimeter of the inclined surface 67. Also, the auxiliary inclined surface 71 has a smooth convex curved surface.

Figure 21:
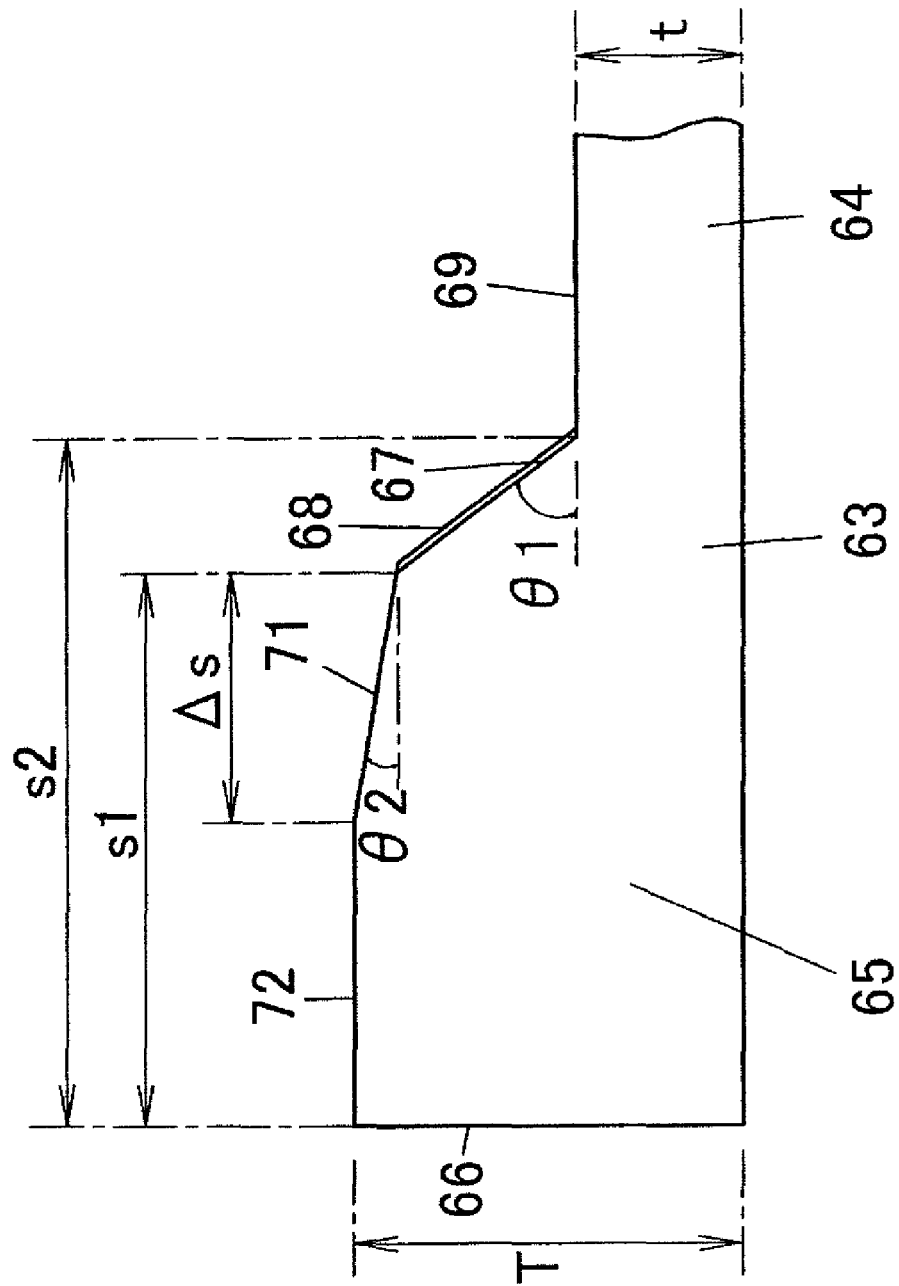
FIG. 21 is a sectional view of the light introducing unit in the second embodiment.

FIG. 21 is a drawing showing optimum numerical values of the surface light source device 81 of the second embodiment. In this embodiment, with the refractive index of the light guide plate 63 being n=1.59 and the vertical angle of the mountain-shaped portion of the directivity conversion pattern 68 is φ3=120°, optimum dimensions of the respective components are:

the thickness of the end face of the light introducing unit 65: T=0.31 mm;

the thickness of the light guide plate body 64: t=0.18 mm (the difference in thickness: T−t=0.13 mm);

the angle of inclination of the inclined surface 67: θ1=15.3°;

the angle of inclination of the auxiliary inclined surface 71: θ2=4°;

the length from the center of the light incident end face 66 to the inner perimeter edge of the directivity conversion pattern 68: s1=2.94 mm; and the length from the center of the light incident end face 66 to the outer perimeter edge of the directivity conversion pattern 68: s2=3.19 mm.

Also, as depicted in FIG. 20, the maximum value of the horizontal length Δs of the auxiliary inclined surface 71 in a front direction is Δsmax=0.9 mm. As the angle β formed with the x-axis direction is increased, the horizontal length Δs of the auxiliary inclined surface 71 is gradually decreased. The width of the auxiliary inclined surface 71 in the y-axis direction is w=4.2 mm.

According to the embodiment described as above, since the auxiliary inclined surface 71 is provided only a part of a region along the inclined surface 67, a processing range and the amount of processing for the auxiliary inclined surface 71 (or a metal mold for molding the auxiliary inclined surface 71) is decreased, thereby facilitating the manufacture of the light guide plate 63.

First Modification Example of Second Embodiment

Figure 22:
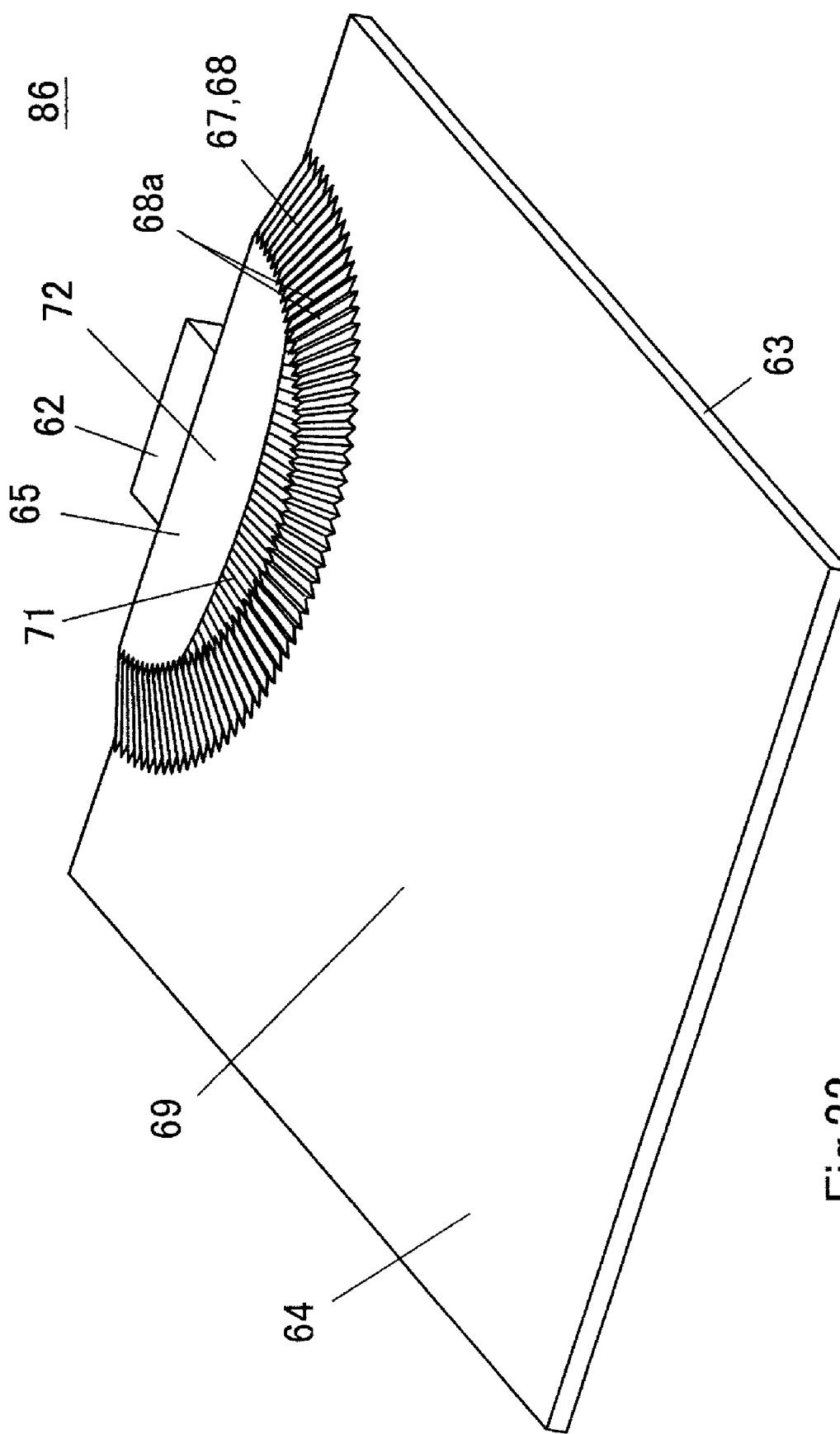
FIG. 22 is a perspective view of a surface light source device according to a first modification example of the second embodiment.
Figure 23:
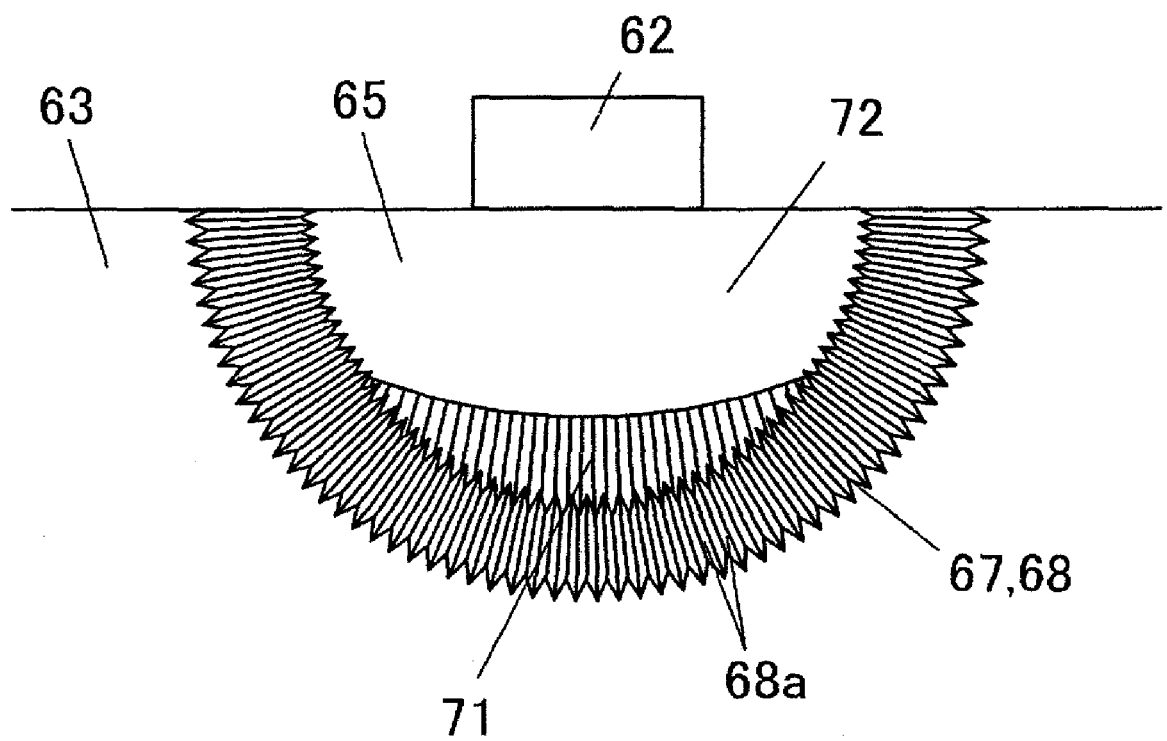
FIG. 23 is an enlarged plan view of the light introducing unit in the second embodiment.

FIG. 22 is a perspective view of a surface light source device 86 according to a first modification example of the second embodiment, and FIG. 23 is an enlarged plan view of its light introducing unit 65. In this first modification example, the auxiliary inclined surface 71 configured of a convex curved surface in the surface light source device 81 of the second embodiment is replaced by a flat surface in a shape of a plurality of strips. In the first modification example, the auxiliary inclined surface 71 is formed as a polyhedron formed by approximating a convex curved surface with a plurality of flat surfaces. Therefore, adjacent flat surfaces protrude to an outer surface side of the light introducing unit 65.

In the surface light source device 86 of this first modification example, since the auxiliary inclined surface 71 is formed of a plurality of flat surfaces, the auxiliary inclined surface 71 (or a metal mold for molding the auxiliary inclined surface 71) can be processed more easily.

Second Modification Example of the Second Embodiment

Figure 24:
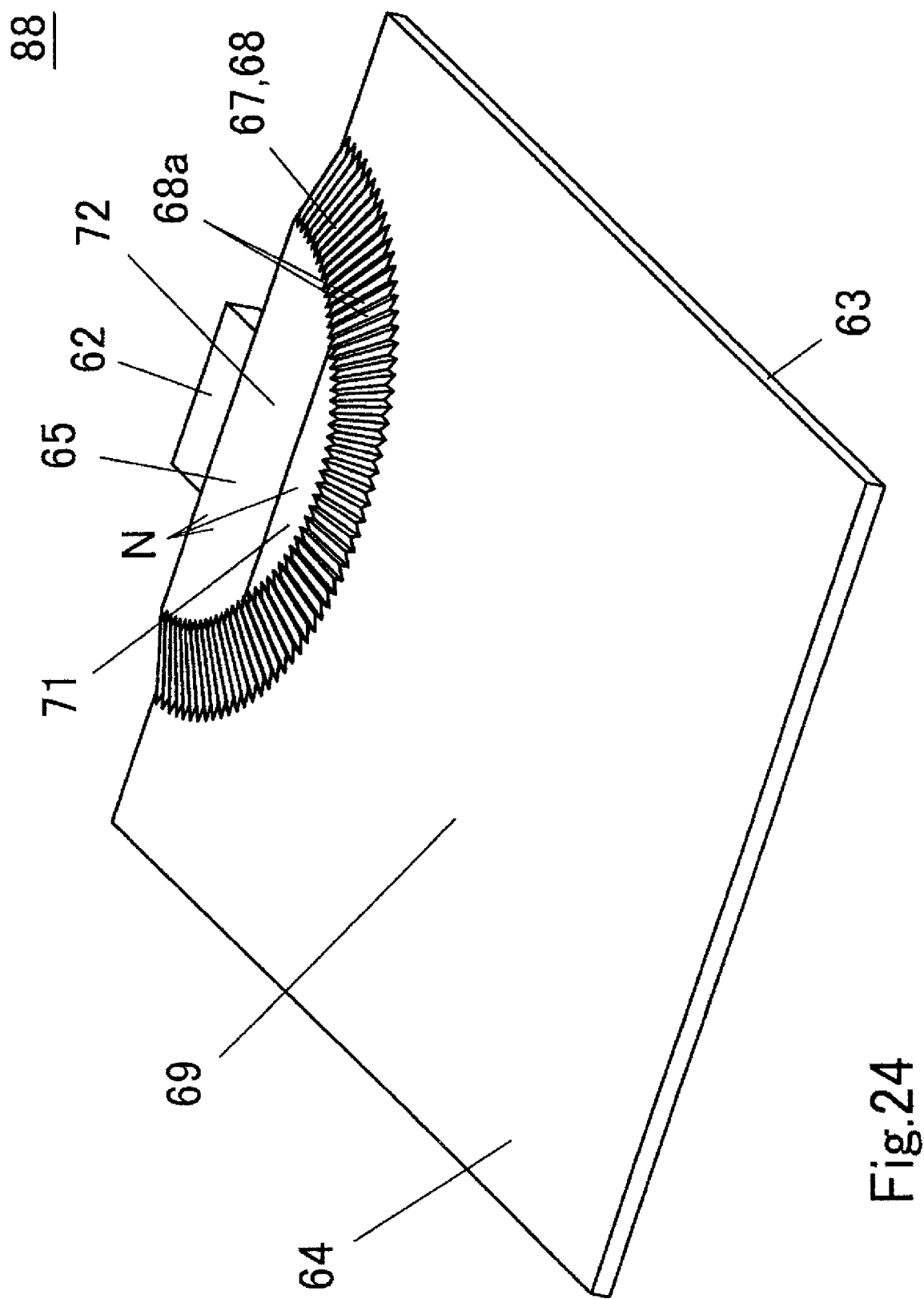
FIG. 24 is a perspective view of a surface light source device according to a second modification example of the second embodiment.
Figure 25:
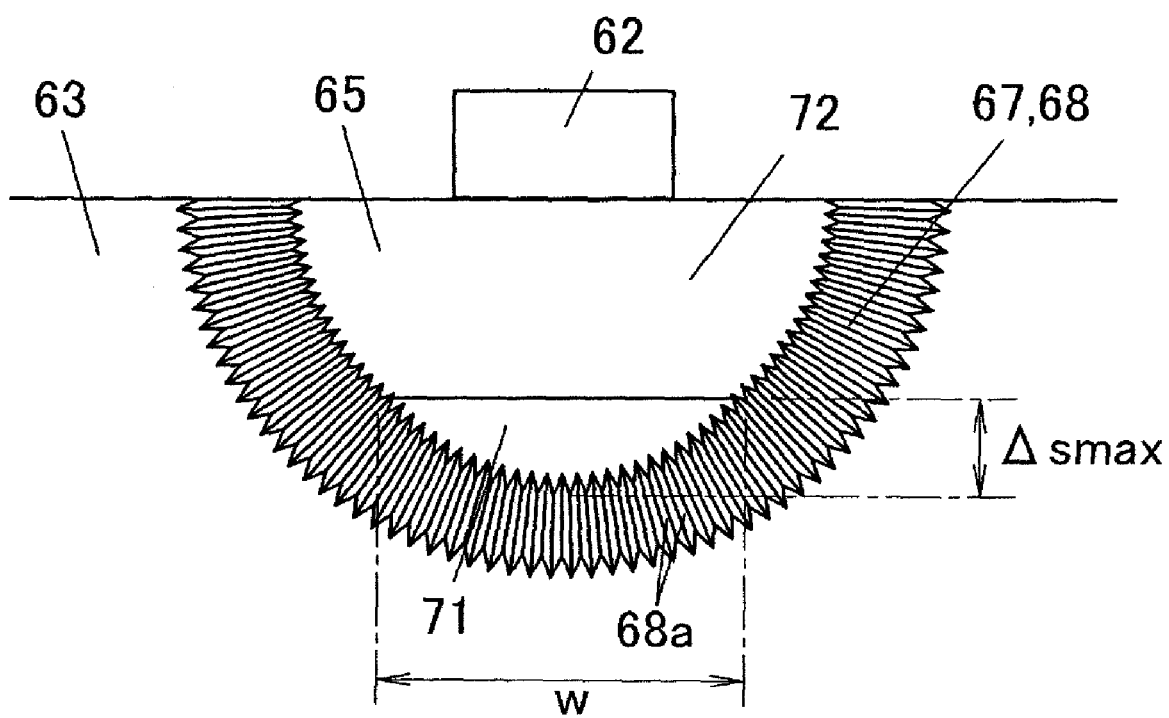
FIG. 25 is an enlarged plan view of a light introducing unit in the second modification example of the second embodiment.

FIG. 24 is a perspective view of a surface light source device 88 according to a second modification example of the second embodiment, and FIG. 25 is an enlarged plan view of its light introducing unit 65. In this second modification example, the auxiliary inclined surface 71 is configured of a single inclined flat surface. The auxiliary inclined surface 71 is inclined toward the front of the point source of light 32, and a normal line perpendicular to the auxiliary inclined surface 71 is parallel to a zx plane.

Optimum numerical values in the surface light source device 88 of this second modification example are equal to those of the second embodiment. Note that the maximum value of the horizontal length Δs of the auxiliary inclined surface 71 in the front direction is equal to that of the second embodiment, Δsmax=0.9 mm. However, since the auxiliary inclined surface 71 is a single flat surface, the width of the auxiliary inclined surface 71 in a y-axis direction is w=3.8 mm.

In the surface light source device 88 of this second modification example, since the auxiliary inclined surface 71 is configured of a single flat surface, the auxiliary inclined surface 71 (or a metal mold for molding the auxiliary inclined surface 71) can be more easily processed.

Third Embodiment

Figure 26:
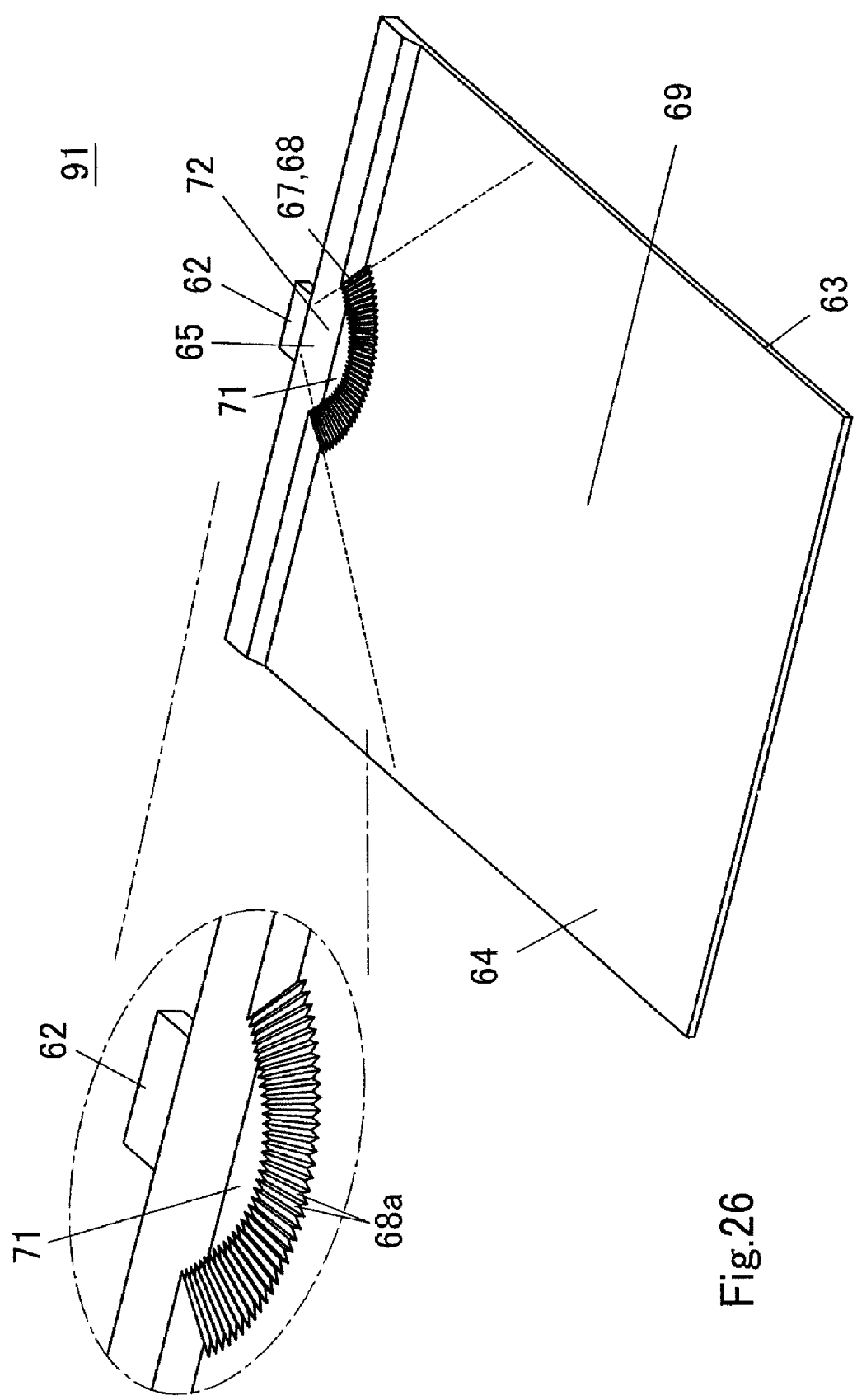
FIG. 26 is a perspective view of a surface light source device according to a third embodiment of the present invention.

FIG. 26 is a perspective view of a surface light source device 91 according to a third embodiment of the present invention. In the third embodiment, the directivity conversion pattern 68 is provided not in a range of 180° centering on the center of the light emission window 62a of the point source of light 62 but only in a range where light can reach (in FIG. 26, a region interposed between two broken lines).

In the surface light source device 81 of the second embodiment, the auxiliary inclined surface 71 is omitted in a region where light cannot reach much. Due to the same reason, in the third embodiment, the directivity conversion pattern 68 is omitted in a range where light cannot reach. As such, by decreasing the range where the directivity conversion pattern 68 is provided, the directivity conversion pattern 68 (or a metal mold for molding the directivity conversion pattern 68) can be processed more easily without degrading optical characteristics of the surface light source device 91.

Fourth Embodiment

Figure 27:
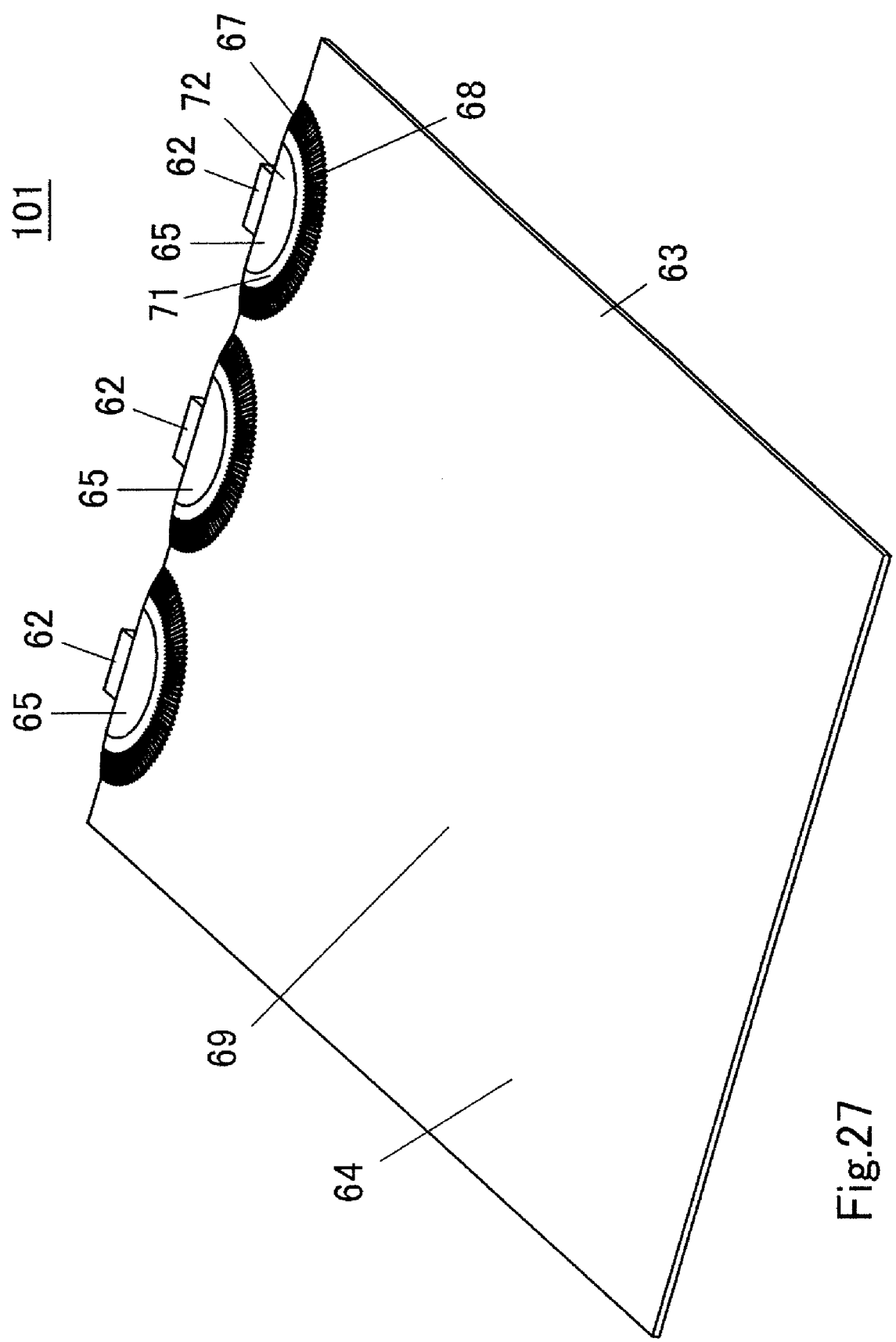
FIG. 27 is a perspective view of a surface light source device according to a fourth embodiment of the present embodiment.

In a surface light source device 101 according to a fourth embodiment depicted in FIG. 27, a plurality of light introducing units 65 described in the first embodiment are provided along an end edge of the light guide plate 63 on a light incident side, and the point source of light 62 is placed so as to face a light incident end face 66 of each light introducing unit 65.

First Modification Example of Fourth Embodiment

Figure 28:
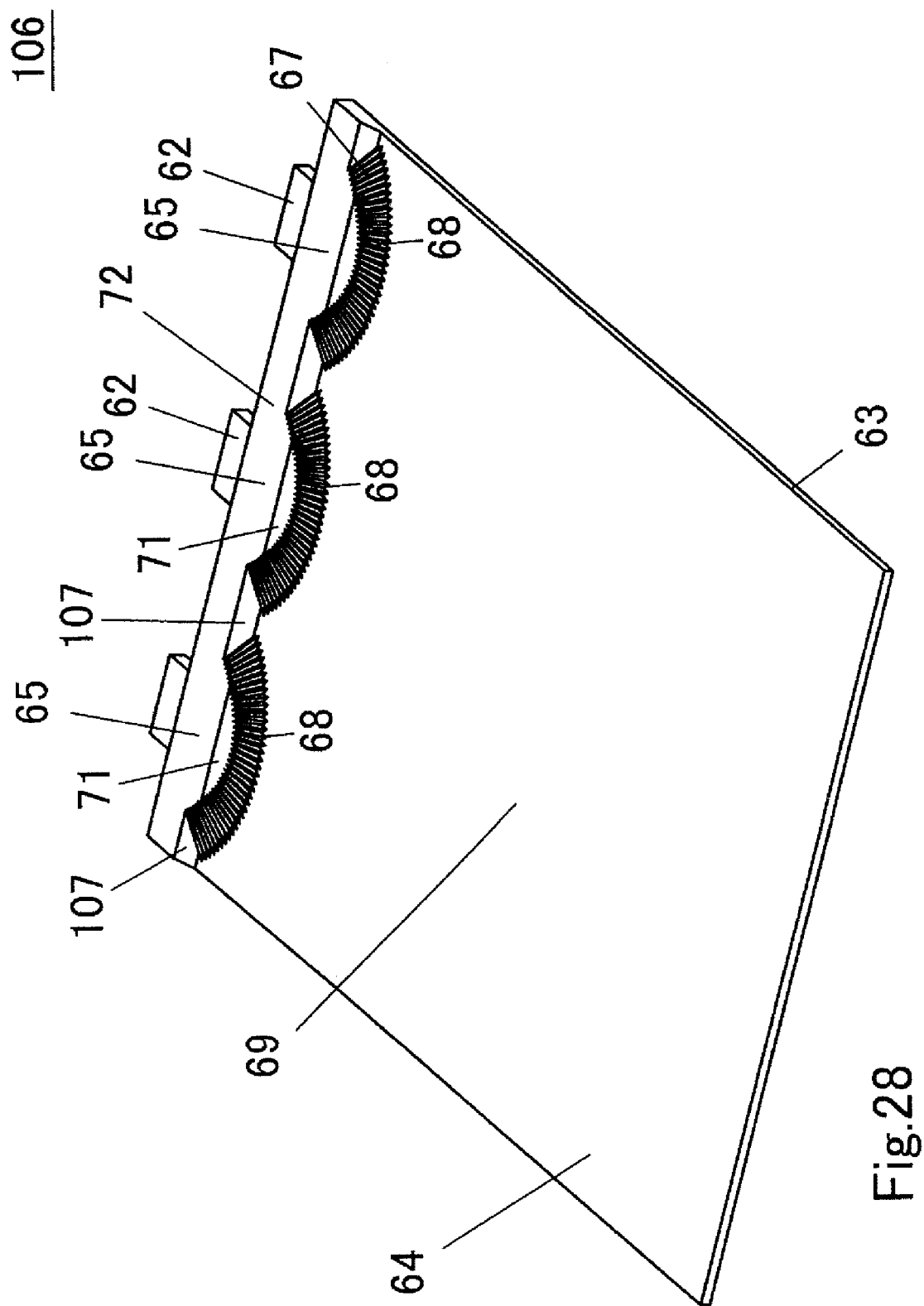
FIG. 28 is a perspective view of a surface light source device according to a first modification example of the fourth embodiment.

A surface light source device 106 depicted in FIG. 28 represents a modification example of the fourth embodiment. A plurality of light introducing units 65 described in the third embodiment are provided along an end edge of the light guide plate 63 on a light incident side, and the point source of light 62 is placed so as to face a light incident end face 66 of each light introducing unit 65. Also, in this surface light source device 106, an intermediate region between the light introducing units 65 and both end portions are each provided with a flat inclined surface 107, and the end edge of the light guide plate 63 on a light incident side has a thick thickness over the entire width.

Second Modification Example of Fourth Embodiment

Figure 29:
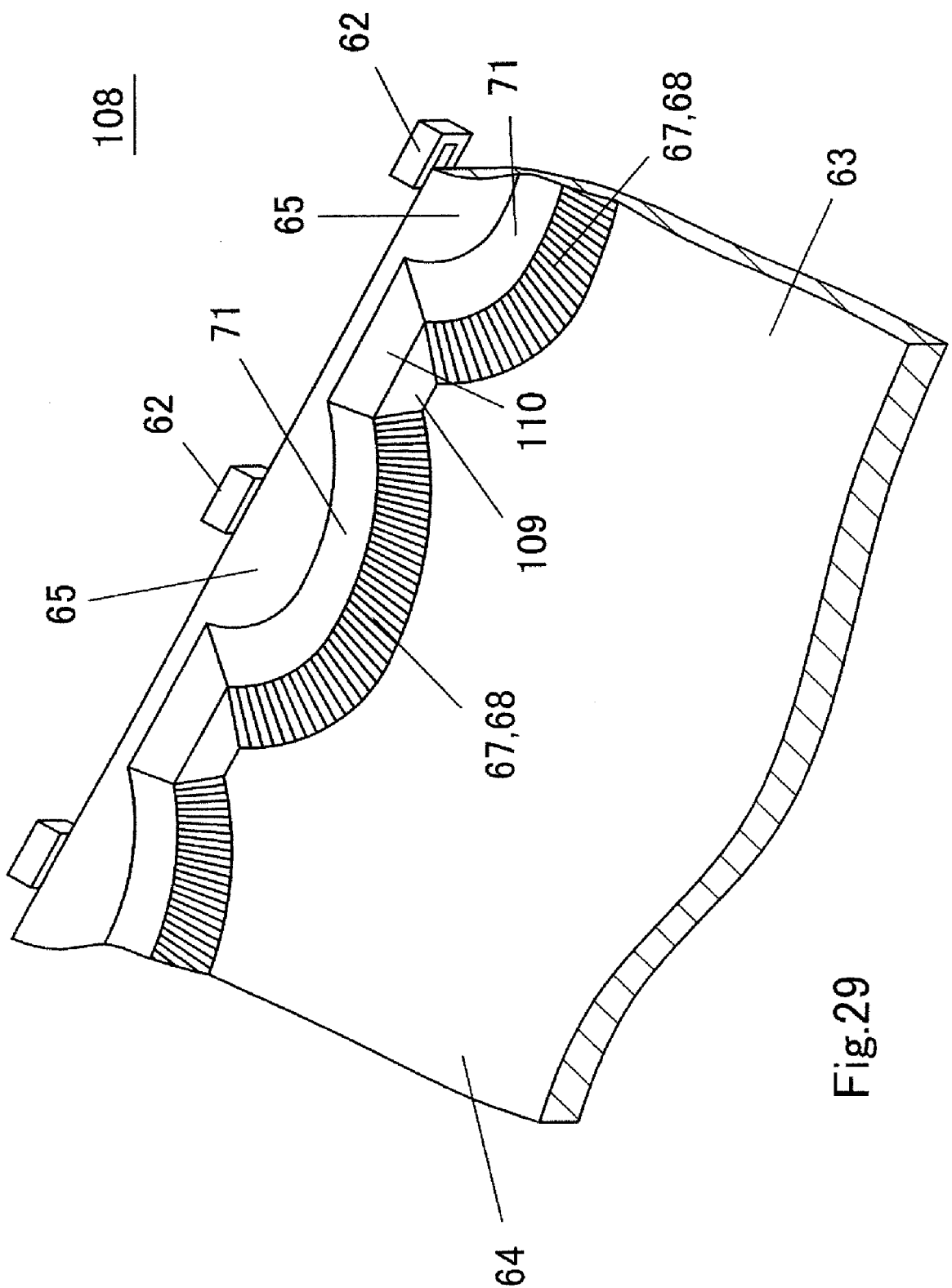
FIG. 29 is a partially-broken perspective view of a surface light source device according to a second modification example of the fourth embodiment.

A surface light source device 108 depicted in FIG. 29 represents another modification example of the fourth embodiment. The surface light source device 108 of FIG. 29 has a structure approximately similar to that of the surface light source device 106 of FIG. 28. A difference between the surface light source device 108 of FIG. 29 and the surface light source device 106 of FIG. 28 is that, in the surface light source device 108 of FIG. 29, the auxiliary inclined surface 71 formed of a smooth curved surface is provided along the inner perimeter edge of the directivity conversion pattern 68 from end to end. Also, in the surface light source device 108, an inclined surface 109 is provided between the directivity conversion patterns 68 of adjacent light introducing units 65 and an inclined surface 110 is provided between the auxiliary inclined surfaces 71 thereof, the inclines surfaces 109 and 110 having different angles of inclination. According to the magnitude of the angle of inclination of the inclined surface 67 and the auxiliary inclined surface 71, the angle of inclination of the inclined surface 110 is smaller than the angle of inclination of the inclined surface 109.

In these surface light source devices 101, 106, and 108, the plurality of point sources of light 62 can be used. Therefore, the luminance in the light emission surface 69 can be increased. Also, by arranging the plurality of point sources of light 62 in a line, light can be sent to a corner portion of the light guide plate 63, and therefore the corner portion of the light guide plate 63 is less prone to being dark.

Fifth Embodiment

Figure 30:
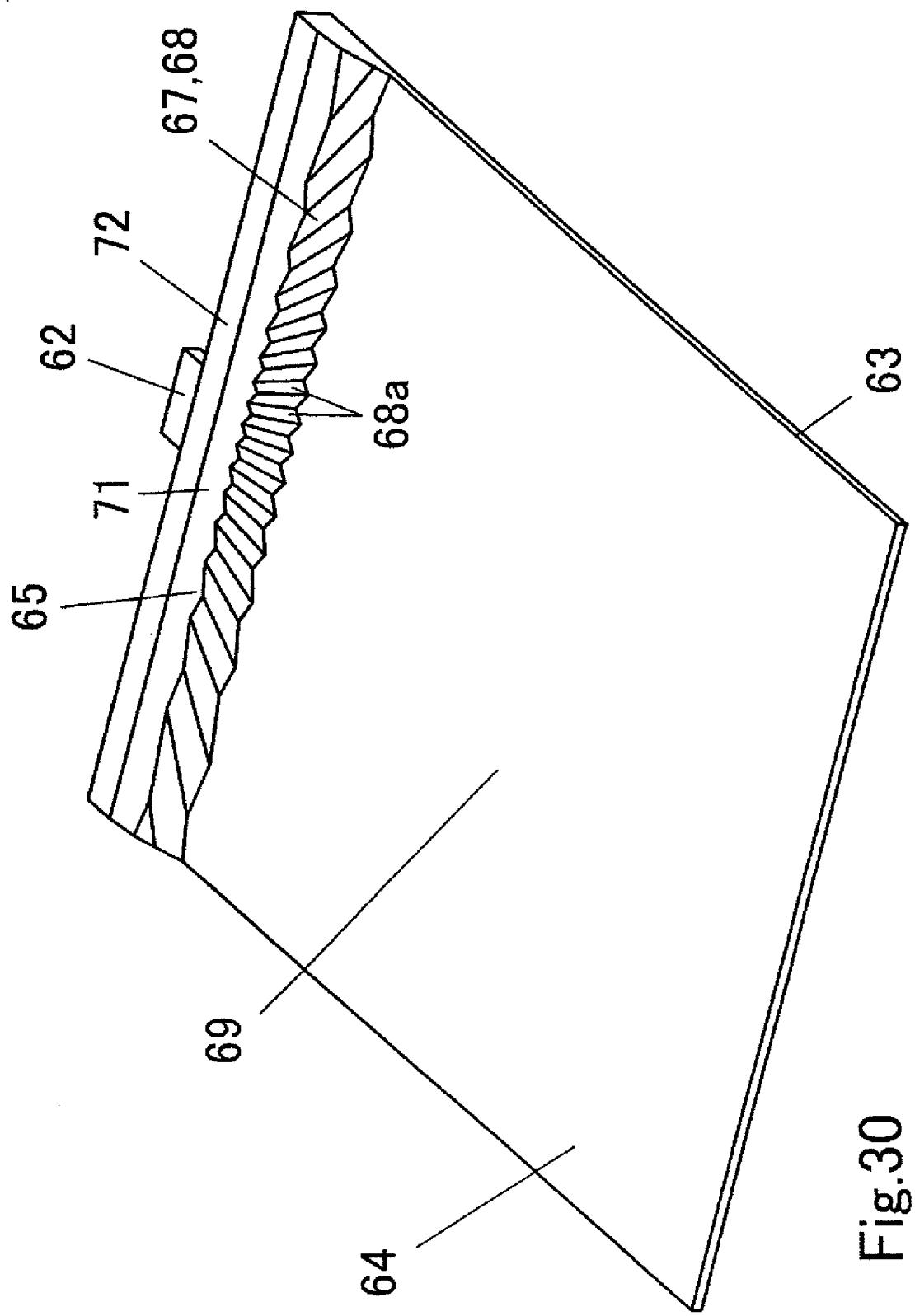
FIG. 30 is a perspective view of a surface light source device according to a fifth embodiment of the present invention.

FIG. 30 is a perspective view of a surface light source device 111 according to a fifth embodiment of the present invention. In this surface light source device 111, the light introducing unit 65 is linearly formed along the entire width of the end edge of the light guide plate 63 on a light incident side. The inclined surface 67 of the light introducing unit 65 is also linearly formed of a flat surface at a certain angle of inclination. The directivity conversion pattern 68 is provided over the entire inclined surface 67, and the V-groove structures 68a forming the directivity conversion pattern 68 are radially arranged centering on a certain point above the point source of light 62. Therefore, the pitch of the V-groove structures 68a varies depending on the position. At the center portion of the directivity conversion pattern 68, the pitch of the V-groove structures 68a is short. As the directivity conversion pattern 68 goes to an end, the pitch of the V-groove structures 68a is increased.

On the inclined surface 67, the band-shaped auxiliary inclined surface 71 is linearly formed adjacently to the inclined surface 67. The auxiliary inclined surface 71 is a flat surface having a uniform angle of inclination. The angle of inclination θ2 of the auxiliary inclined surface 71 is smaller than the angle of inclination θ1 of the inclined surface 67. Thus, envelope lines on upper and lower end sides of the directivity conversion pattern 68 are linear. Also, above the auxiliary inclined surface 71 is the horizontal upper surface 72 of the light introducing unit 65.

The directivity conversion pattern 68 and the auxiliary inclined surface 71 in this mode are also designed in a manner similar to that of the first embodiment. For example, an angle formed by a line segment connecting one end of the light emission window 62a of the point source of light 62 and a center of an upper end edge of the directivity conversion pattern 68 and a line segment connecting a center of the light emission window 62a and the center of the upper end edge of the directivity conversion pattern 68 is designed to be 30°. This angle is determined by a distance between the point source of light 62 and the envelope line on an upper end side of the directivity conversion pattern 68 and the width of the light emission window 62a. Also, an angle of inclination of the inclined surface 67 is θ1=15.3° and an angle of inclination of the auxiliary inclined surface 71 is θ2=4°

First Modification Example of Fifth Embodiment

Figure 31:
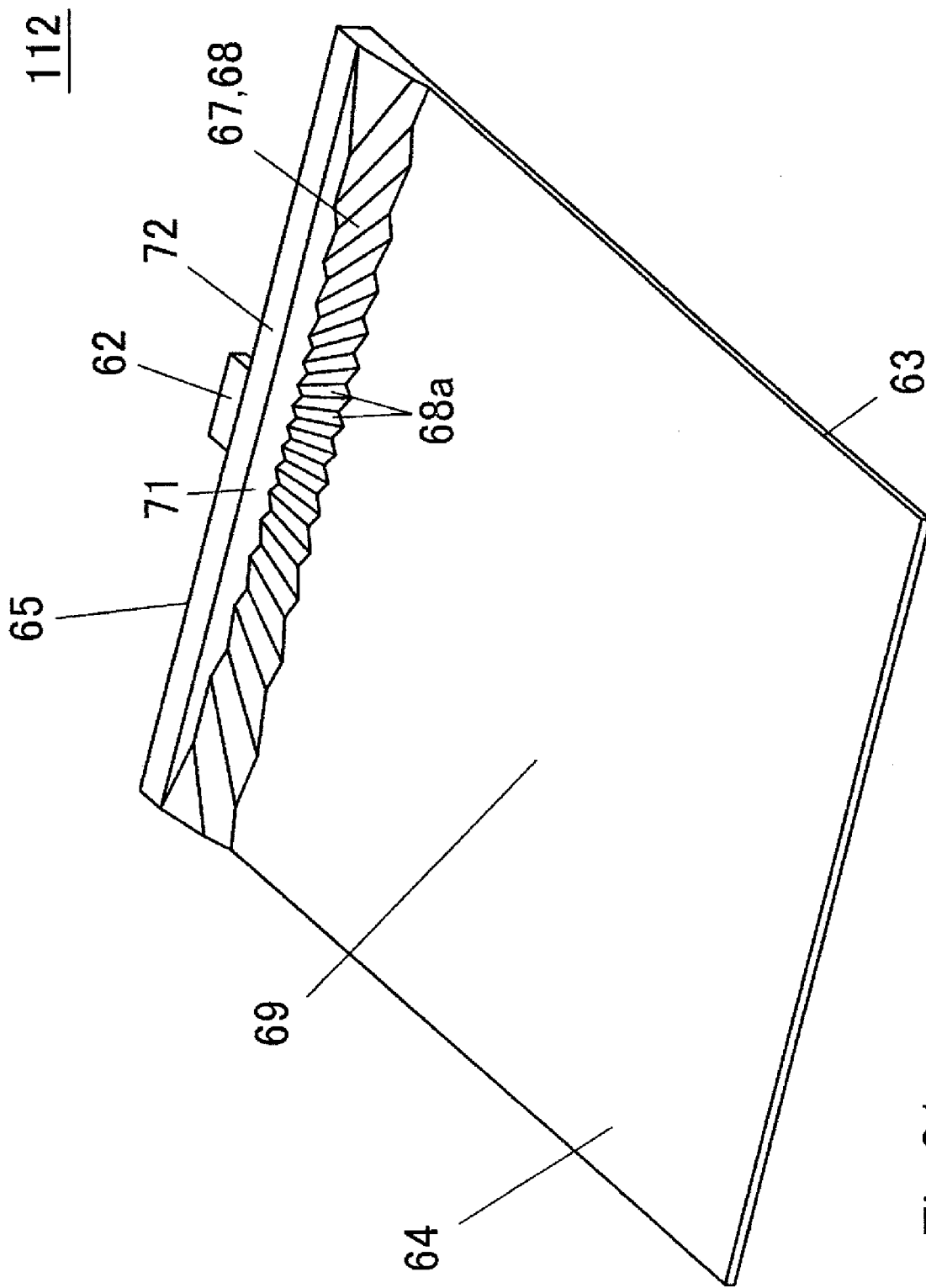
FIG. 31 is a perspective view of a surface light source device according to a first modification example of the fifth embodiment.

A surface light source device 112 depicted in FIG. 31 represents a first modification example of the fifth embodiment. In the first modification example, the auxiliary inclined surface 71 is configured to have a maximum horizontal length at the front of the point source of light 62, and the horizontal length of the auxiliary inclined surface 71 gradually decreases in a direction falling outside of the front of the point source of light 62. For example, the upper edge of the auxiliary inclined surface 71 can be formed in a linear shape, and the lower edge of the auxiliary inclined surface 71 can be formed in an arc shape.

Second Modification Example of Fifth Embodiment

Figure 32:
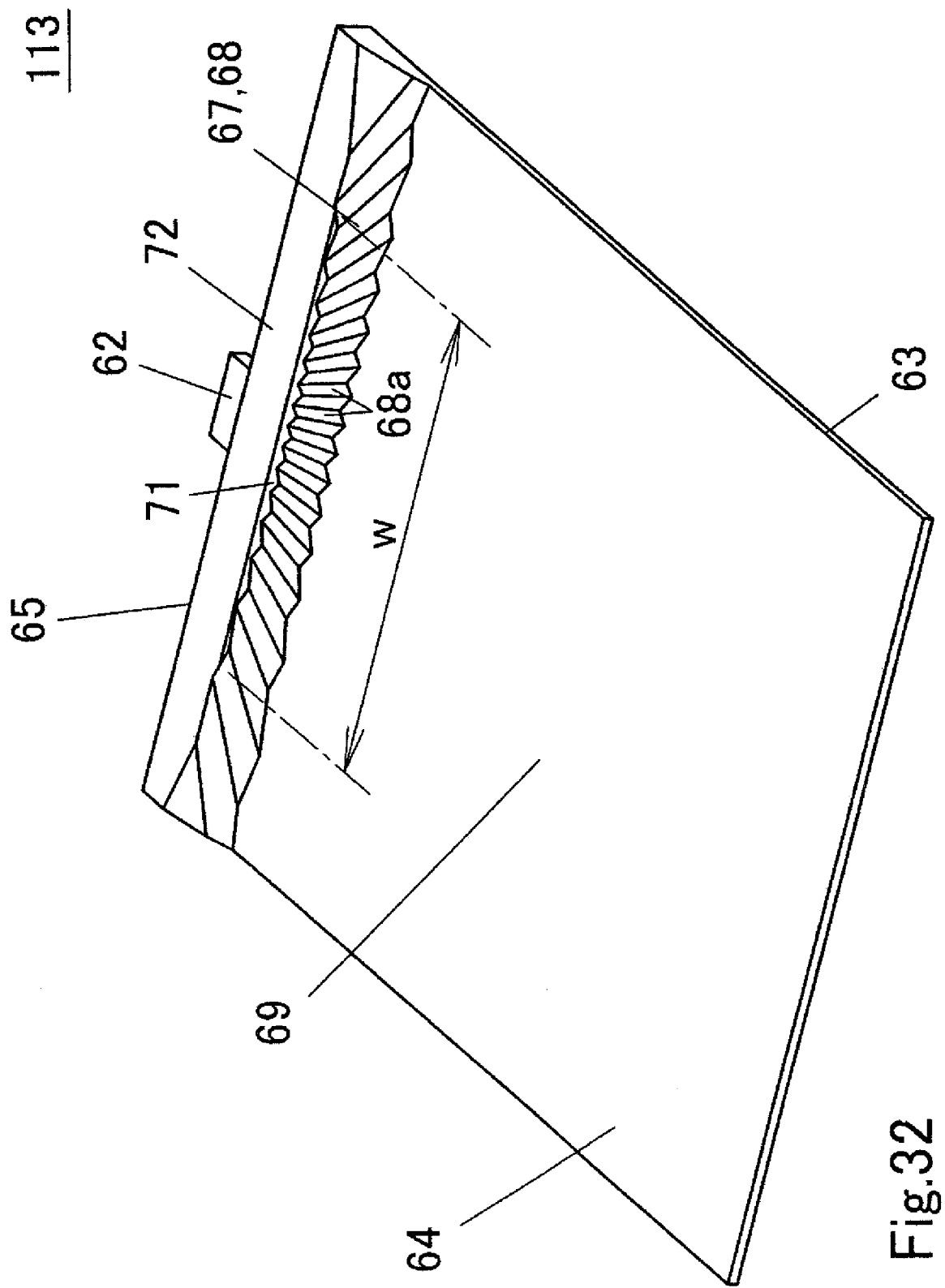
FIG. 32 is a perspective view of a surface light source device according to a second modification example of the fifth embodiment.
Figure 34:
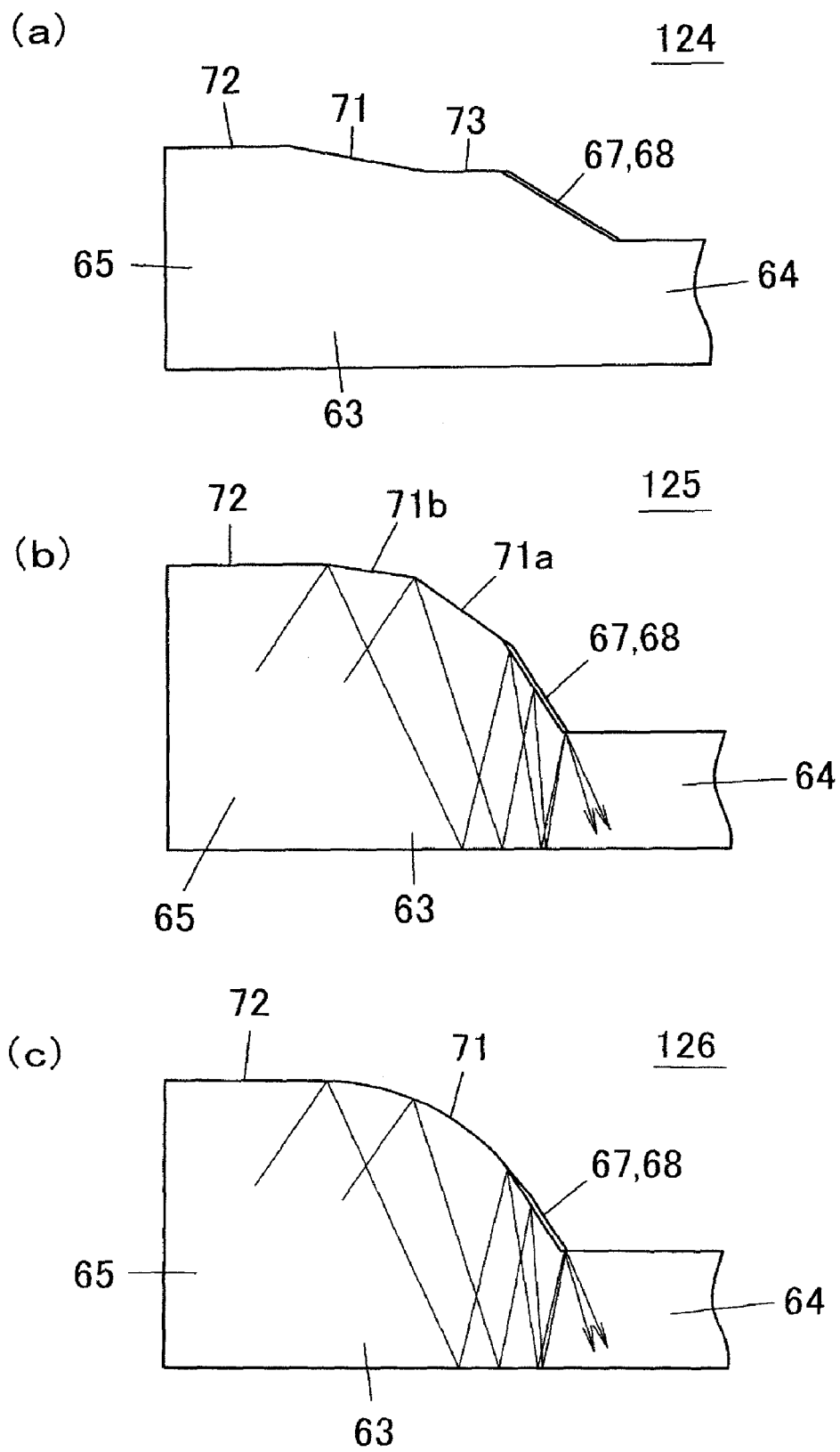
FIGS. 34(a) to 34(c) are schematic sectional views of the structure of still another light introducing unit of the present invention.
Figure 37:
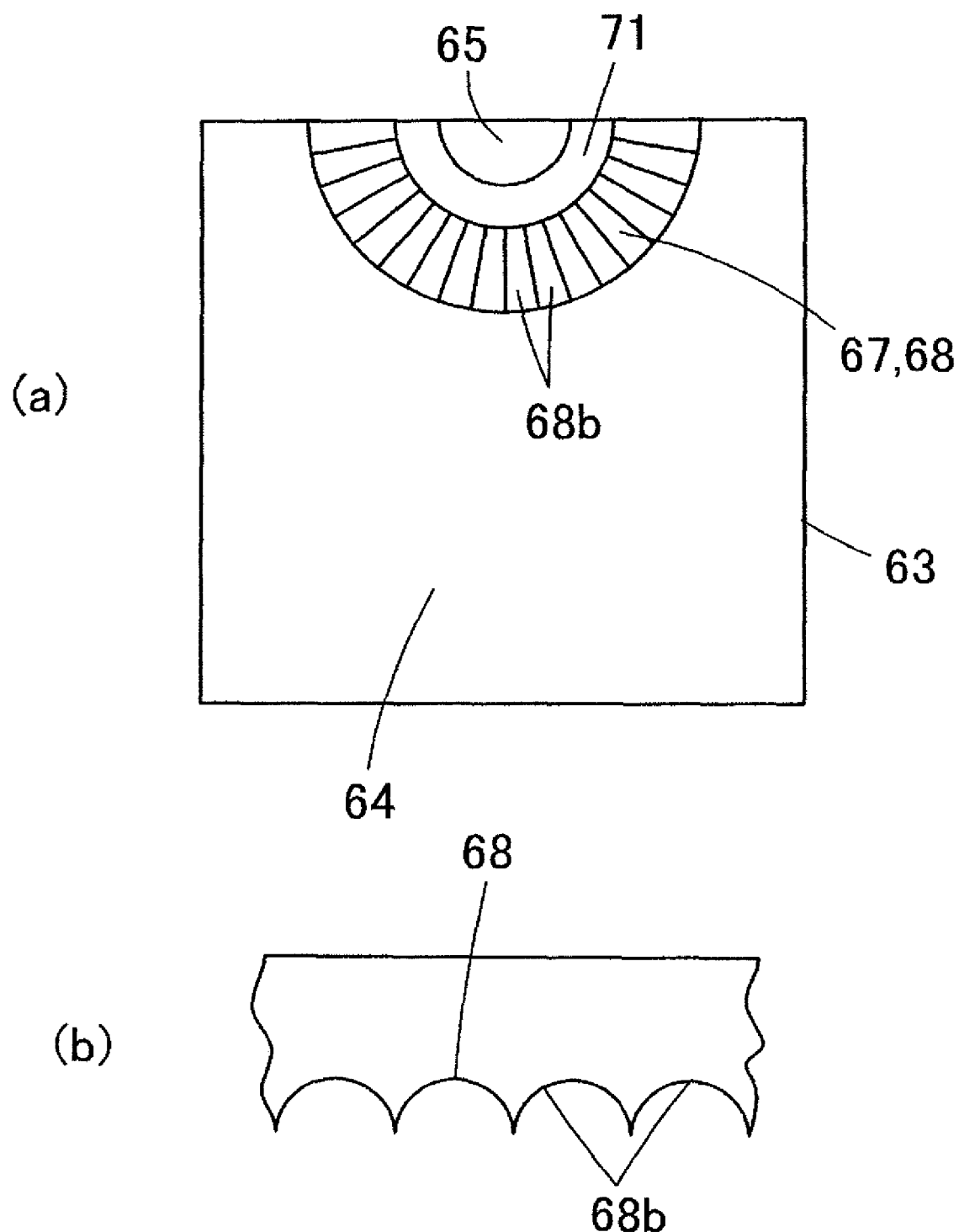
FIG. 37(a) is a schematic plan view of a light guide plate including still another directivity conversion pattern in the sixth embodiment.
FIG. 37(b) is an enlarged sectional view of its directivity conversion pattern.

A surface light source device 113 depicted in FIG. 32 represents a second modification example of the fifth embodiment. In the second modification example, a region where the auxiliary inclined surface 71 is provided is restricted to a region having a width w including the front of the point source of light 62. That is, the region where the auxiliary inclined surface 71 is provided is restricted to a region that light from the point source of light 62 reaches. And, the auxiliary inclined surface 71 is configured to have a maximum horizontal length at the front of the point source of light 62, and the horizontal length of the auxiliary inclined surface 71 gradually decreases in a direction falling outside of the front of the point source of light 62.

Other Embodiments

FIGS. 33(a) to 33(c) and FIGS. 34(a) to 34(c) represent other embodiments of the present invention. In a surface light source device 121 of an embodiment depicted in FIG. 33(a), instead of providing the directivity conversion pattern 68 on the inclined surface 67, the directivity conversion pattern 68 is separated from the inclined surface 67, and the directivity conversion pattern 68 is provided on a surface opposite to the surface where the inclined surface 67 of the light guide plate 63 is provided. The directivity conversion pattern 68 is provided in a band-shaped region in a shaped of an arc centering on the position of the point source of light on the back surface of the light guide plate 63. In this embodiment, the back surface of the light guide plate 63 is dented in a region of the directivity conversion pattern 68, and the V-groove structures 68a are arranged in that dented portion, thereby achieving the directivity conversion pattern 68.

Even when the directivity conversion pattern 68 is provided on the back surface of the light guide plate 63 in this manner, if the auxiliary inclined surface 71 is not provided, like light represented by a broken line in FIG. 33(a), light entering the directivity conversion pattern 68 a plurality of times leaks from the directivity conversion pattern 68 to the outside to degrade light use efficiency when the size directivity conversion pattern 38 is decreased. By contrast, if the auxiliary inclined surface 71 is provided, like light represented by a solid line in FIG. 33(a), light can be prevented from entering the directivity conversion pattern 68 a plurality of times, and leakage of light from the directivity conversion pattern 68 to the outside can be suppressed.

In a surface light source device 122 depicted in FIG. 33(b), in an embodiment in which the directivity conversion pattern 68 is provided on a back surface side of the light guide plate 63, the auxiliary inclined surface 71 having an angle of inclination smaller than that of the inclined surface 67 is provided on an outer perimeter side of the inclined surface 67.

Also, a surface light source device 123 depicted in FIG. 33(c) is provided with the directivity conversion pattern 68 on a back surface side of the light guide plate 63. The auxiliary inclined surface 71 is provided so as to protrude from the back surface of the light guide plate 63.

In a surface light source device 124 depicted in FIG. 34(a), the inclined surface 67 and the auxiliary inclined surface 71 are not adjacent to each other, but a horizontal plane 73 is interposed between the inclined surface 67 and the auxiliary inclined surface 71. In this embodiment, although the effect is slightly decreased compared with the case in which the inclined surface 67 and the auxiliary inclined surface 71 are adjacent to each other, there is still an improving effect compared with the case in which the auxiliary inclined surface 71 is not present.

In a surface light source device 125 depicted in FIG. 34(b), an auxiliary inclined surface 71a (a second inclined surface) is provided adjacently to the inclined surface 67, and further an auxiliary inclined surface 71b (a second inclined surface) is provided adjacently to the auxiliary inclined surface 71a. The auxiliary inclined surfaces 71a and 71b are smooth inclined surfaces without asperities such as the V-groove structure 68a. The angle of inclination of the auxiliary inclined surface 71a is smaller than the angle of inclination of the inclined surface 67, and the angle of inclination of the auxiliary inclined surface 71b is smaller than the angle of inclination of the auxiliary inclined surface 71a. In this embodiment, it is difficult to process the light introducing unit 65, but the effect of decreasing light entering the directivity conversion pattern 68 a plurality of times to improve light use efficiency is improved.

In a surface light source device 126 depicted in FIG. 34(c), the auxiliary inclined surface 71 is curved so that the angle of inclination is gradually changed along an inclined direction of the auxiliary inclined surface 71. That is, a profile of the auxiliary inclined surface 71 in a section passing through the point source of light and being perpendicular to the light emission surface 69 is curved. In particular, in the depicted example, the angle of inclination of the auxiliary inclined surface 71 is continuously changed, from top to toward bottom, from 0° to an angle of inclination equal to the angle of inclination of the inclined surface 67, and the auxiliary inclined surface 71 is smoothly connected to the upper surface 72 and the inclined surface 67. Also in this embodiment, it is difficult to process the light introducing unit 65, but the effect of decreasing light entering the directivity conversion pattern 68 a plurality of times to improve light use efficiency is improved.

Sixth Embodiment

In the embodiments described so far, a method of eliminating light leakage from the light guide plate with an approximately strict structure has been considered. In the following, a more general structure is described. That is, the directivity conversion pattern having a V-groove structure as described in the foregoing is not necessarily required and, with a directivity conversion pattern formed of patterns (asperity patterns) extending in a radial direction and centering near the point source of light, when the directivity of light reflected off the directivity conversion pattern is extended in a direction orthogonal to a light source direction (a direction connecting a light reflection point and the center of the point source of light), a directivity spread of light entering the light introducing unit in a thickness direction of the light guide plate can be converted to a directivity characteristic inclined toward a direction parallel to the surface direction of the light guide plate, thereby decreasing light leakage from or near the inclined surface 67.

The reason for this is described in detail in Patent Document 4 (in particular, paragraphs 0138-0141, FIGS. 55 to 57, and others). Here, the description in Patent Document 4 is incorporated and not described in detail herein.

Figure 39:
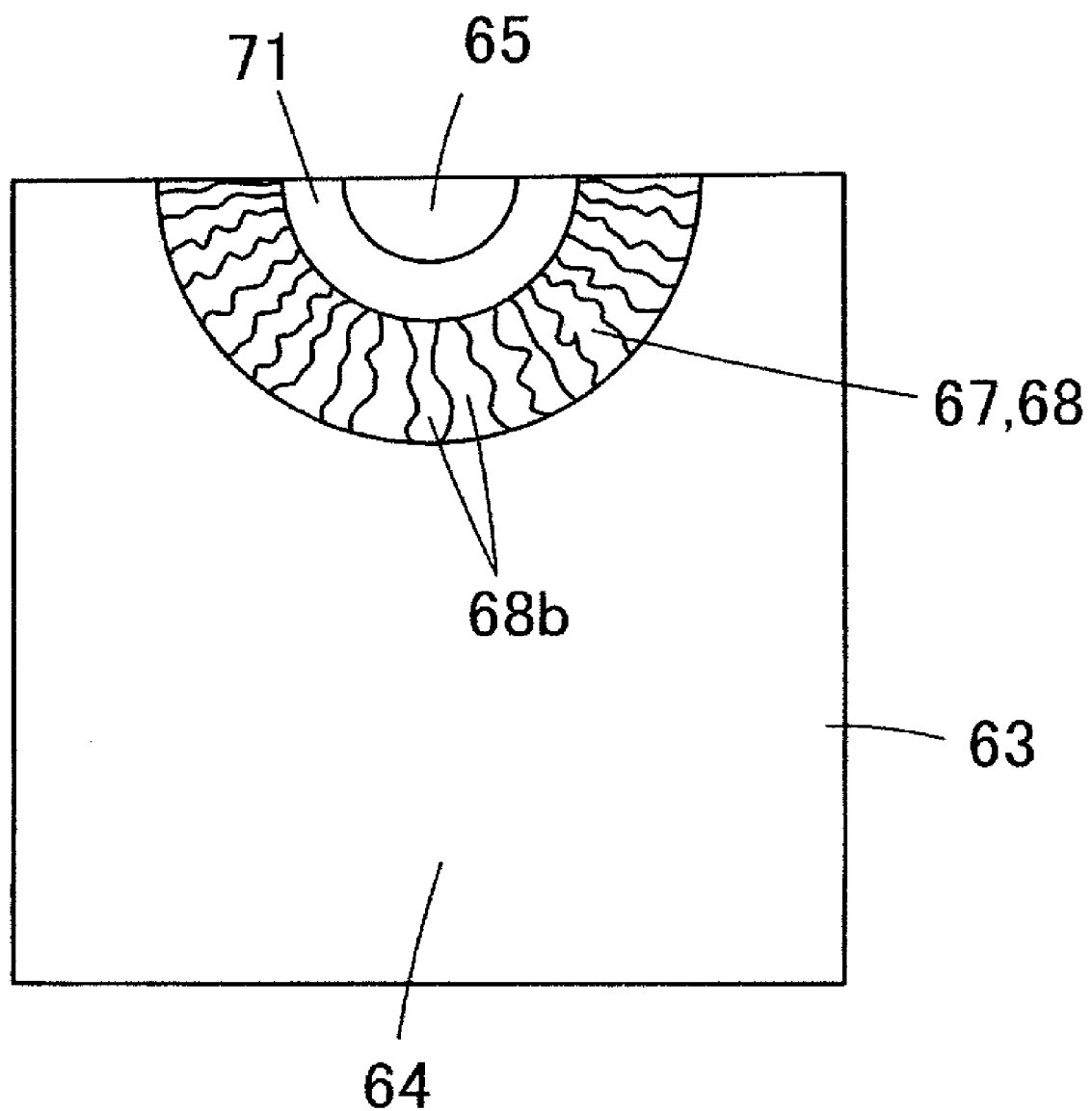
FIG. 39 is a schematic plan view of a light guide plate including still another directivity conversion pattern in the sixth embodiment.

As such an embodiment described above, for example, those depicted in FIGS. 35(a) and (b) to FIG. 39. In FIGS. 35(a) and 35(b), the directivity conversion pattern 68 is configured by radially arranging asperity structures 68b each in a cylindrical lens shape or an oval groove shape (an elliptical spherical surface shape) centering on the point source of light 62 so that the longitudinal direction of each asperity structure 68b is approximately parallel to a light source direction. In FIGS. 36(a) and 36(b), the directivity conversion pattern 68 is configured by radially arranging the asperity structures 68b each in a V-groove shape centering on the point source of light 62 so that the longitudinal direction of each asperity structure 68b is approximately parallel to a light source direction. In FIGS. 27(a) and 27(b), the directivity conversion pattern 68 is configured by radially arranging the asperity structures 68b each in a U-groove shape centering on the point source of light 62 so that the longitudinal direction of each asperity structure 68b is approximately parallel to a light source direction. In FIGS. 28(a) and 28(b), the directivity conversion pattern 68 is configured by radially arranging the asperity structures 68b each in a diffraction grating shape centering on the point source of light 62 so that the longitudinal direction of each asperity structure 68b is approximately parallel to a light source direction. In FIG. 39, the directivity conversion pattern 68 is configured by radially arranging the asperity structures 68b each waved as meandering when viewed from the z-axis direction, centering on the point source of light 62 so that the longitudinal direction of each asperity structure 68b is approximately parallel to a light source direction. In any of the embodiments of FIGS. 35(a) and (b) to FIG. 39, the auxiliary inclined surface 71 is provided along the inner perimeter edge of the directivity conversion pattern 68 and, alternatively, may be provided along the outer perimeter edge of each directivity conversion pattern 68 or on both sides thereof.

Seventh Embodiment

Figure 40:
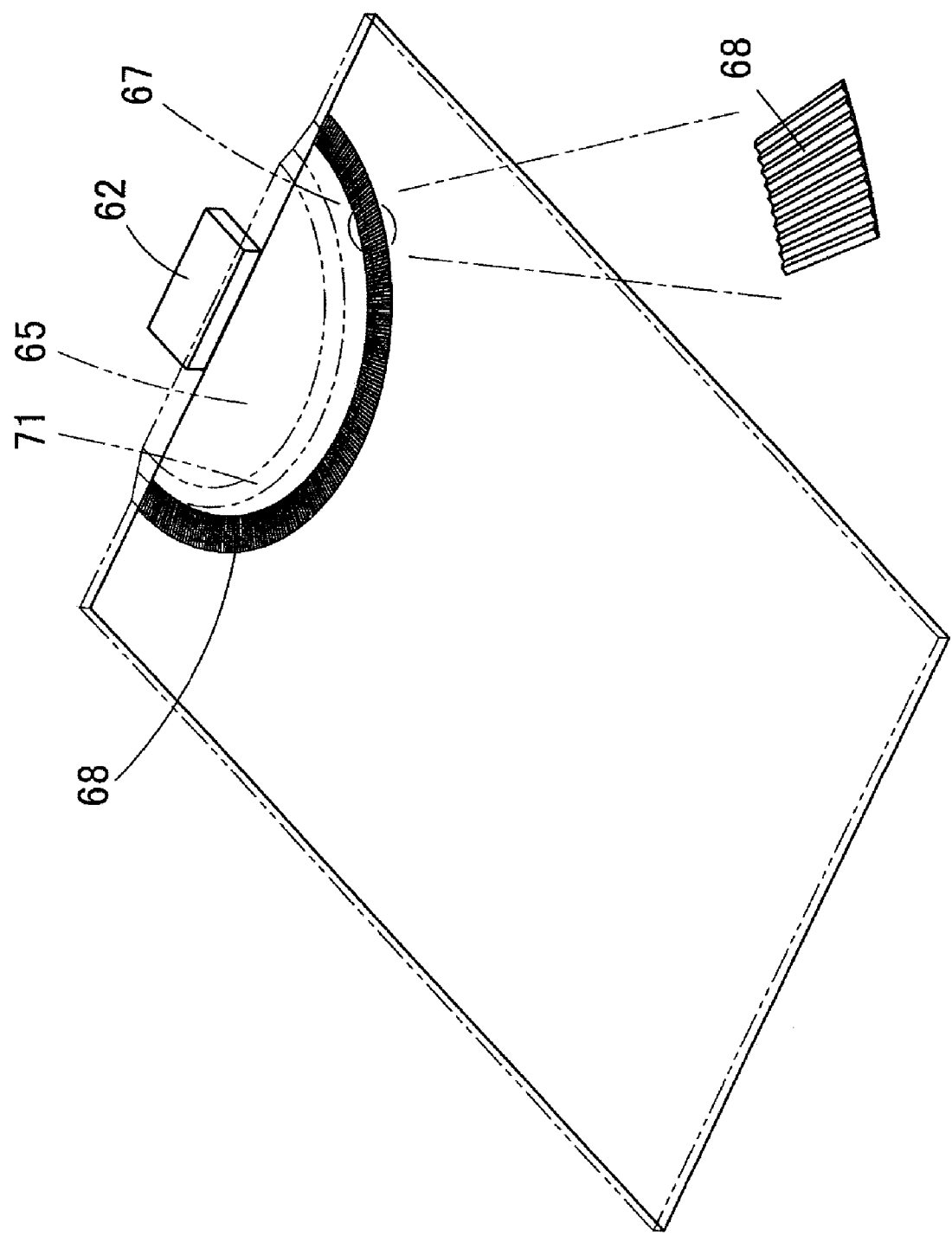
FIG. 40 is a schematic view of a light guide plate according to a seventh embodiment of the present invention.

FIG. 40 is a schematic perspective view of a surface light source device 127 according to a seventh embodiment of the present invention. In this embodiment, the inclined surface 67 of the light introducing unit 65 has a flat surface without a pattern. On the other hand, the directivity conversion pattern 68 is provided on a surface opposite to the surface where the inclined surface 67 of the light guide plate 63 is provided. Note that the flat inclined surface 67 may have a reflective plate (not shown) affixed thereto.

In this embodiment, at least part of light reflected off the auxiliary inclined surface 71 or the inclined surface 67 enters the directivity conversion pattern 68. By changing the directivity by the directivity conversion pattern 68, light leakage on the back surface of the light guide plate 63 can decreased, thereby efficiently guiding light to the light guide plate body 64.

Note that since the invention of the present application relates to an improvement of the surface light source device disclosed in Patent Document 4, the technological structure disclosed in Patent Document 4 can be applied to the invention of the present application as long as the structure does not contradict with the structure of the invention of the present application.

The invention claimed is:
1. A surface light source device comprising:
a point source of light; and
a light guide plate causing light of the point source of light to be introduced from a light incident surface and be emitted from a light emission surface to outside,
wherein the point source of light is provided at a position facing the light incident surface of the light guide plate,
wherein the light guide plate includes a light introducing unit for trapping light from the point source of light entering from the light incident surface, and a light guide plate body having a thickness smaller than a maximum thickness of a light introducing unit, being provided so as to be continuous to the light introducing unit, and causing the trapped light to be emitted from the light emission surface to outside by light emitting means,
wherein the light introducing unit comprises a first inclined surface on a surface of the light guide plate on a light emission side or a surface opposite thereto, the first inclined surface being inclined from a surface of a portion having a thickness larger than that of the light guide plate body toward an end of a surface of the light guide plate body,
wherein the light introducing unit comprises a second inclined surface having an angle of inclination smaller than that of the first inclined surface, the second inclined surface being provided on at least one of a side closer to the point source of light than the first inclined surface and a side more distant from the point source of light than the first inclined surface, and
wherein the light introducing unit comprises a directivity conversion pattern on a surface of the light guide plate body on a light emission side or a surface opposite thereto, the directivity conversion pattern formed of patterns extending in a radial direction and centering near the point source of light, the pattern for converting a directivity spread of light entering the light introducing unit in a thickness direction of the light guide plate to a directivity characteristic inclined toward a direction parallel to a surface direction of the light guide plate.

2. The surface light source device according to claim 1, wherein
the first inclined surface and the second inclined surface are provided to areas adjacent to each other.

3. The surface light source device according to claim 1, wherein
the second inclined surface is provided to only part of either one of an adjacent area along the first inclined surface on a side close to the point source of light and an adjacent area along the first inclined surface on a side away from the point source of light.

4. The surface light source device according to claim 1, wherein
the second inclined surface is configured of a flat surface, and a normal line perpendicular to the second inclined surface is within a plane perpendicular to the light incident surface and the light emission surface.

5. The surface light source device according to claim 1, wherein
the second inclined surface is configured of a plurality of flat surfaces, and flat surfaces adjacent to each other both protrude toward an outer surface side of the light introducing unit.

6. The surface light source device according to claim 1, wherein
the second inclined surface is configured of a curved surface.

* * * * *